(12) United States Patent
Chang et al.

(10) Patent No.: US 6,950,415 B2
(45) Date of Patent: Sep. 27, 2005

(54) APPARATUS AND METHOD FOR MANAGING DORMANT STATE IN A WIRELESS PACKET DATA SYSTEM

(75) Inventors: Hoon Chang, Seoul (KR); Tae-Won Kim, Seoul (KR); Sung-Won Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 939 days.

(21) Appl. No.: 09/933,107

(22) Filed: Aug. 20, 2001

(65) Prior Publication Data

US 2002/0041576 A1 Apr. 11, 2002

(30) Foreign Application Priority Data

Aug. 18, 2000 (KR) .......................................... 2000-47912

(51) Int. Cl.⁷ ................................................ H04Q 7/00
(52) U.S. Cl. ...................................... 370/331; 455/436
(58) Field of Search ................................ 370/328, 329, 370/331, 338, 332, 333; 455/422.1, 436, 437, 438, 439, 560

(56) References Cited

U.S. PATENT DOCUMENTS

| | | | |
|---|---|---|---|
| 6,064,885 A | * | 5/2000 | Rouhollahzadeh et al. . 455/439 |
| 6,091,953 A | * | 7/2000 | Ho et al. ..................... 455/433 |
| 6,148,201 A | * | 11/2000 | Ernam et al. ................ 455/433 |
| 6,233,222 B1 | * | 5/2001 | Wallentin .................... 370/229 |
| 6,295,452 B1 | * | 9/2001 | Choi .......................... 455/436 |
| 6,389,282 B1 | * | 5/2002 | Hirsch ........................ 455/423 |
| 6,487,406 B1 | * | 11/2002 | Chang et al. ............. 455/422.1 |
| 6,535,732 B1 | * | 3/2003 | McIntosh et al. ........... 455/445 |
| 6,553,227 B1 | * | 4/2003 | Ho et al. ..................... 455/433 |
| 6,574,475 B1 | * | 6/2003 | Suzuki ....................... 455/438 |
| 6,801,508 B1 | * | 10/2004 | Lim ........................ 370/310.1 |

* cited by examiner

*Primary Examiner*—Bob A. Phunkulh
(74) *Attorney, Agent, or Firm*—Dilworth & Barrese LLP

(57) ABSTRACT

Disclosed are an apparatus for and a method of managing the location of a packet call in the wireless environment of a wireless packet data system. A dormant-state mobile station management is carried out by registering call information in a dormant state database in response to an initial request for a packet data service, registering dormant state information in a pointer lookup table, and updating location information of a mobile station entering a dormant state, based on the dormant state information, in response to a message received from the mobile station, or resuming the packet data service. In accordance with the invention, it is possible to reduce the connection time and load required to resume a call establishment associated with the mobile station maintained in a dormant state.

32 Claims, 23 Drawing Sheets

APPARATUS AND METHOD FOR MANAGING DORMANT STATE IN A WIRELESS PACKET DATA SYSTEM

PRIORITY

This application claims priority to an application entitled "Apparatus and Method for Managing Dormant State in a Wireless Packet Data System" filed in the Korean Industrial Property Office on Aug. 18, 2000 and assigned Serial No. 2000-47912, the contents of which are hereby incorporated by reference.

BACKGROUND OF THE INVENTION

1. Field of the Invention

The present invention relates generally to a wireless packet data system, and in particular, to an apparatus and method for managing a location of a packet call in a radio environment.

2. Description of the Related Art

In general, a wireless packet data system is included in a mobile communication system, and refers to a system for transmitting data in the form of a packet through a wireless network. For example, the system includes a CDMA (Code Division Multiple Access) system, a PCS (Personal Communications Services) system and a future mobile communication system such as a CDMA-2000 system and a W-CDMA system, standardizations of which are under way.

Meanwhile, the wireless packet data system must necessarily manage information on a mobile in service in order to provide a packet call service. Here, since the "mobile" refers to a mobile station (MS) and not a base station (BS), the information on the mobile must necessarily include location information of the mobile. Further, a base station controller (B SC) constituting the wireless packet data system processes packet data incoming and outgoing to/from the mobile according to the managed location information of the mobile.

The location information is managed in different ways according to states of the mobile. In an active state and a control hold state where certain channels are established, the location information is managed through a handover. That is, since the mobile performs a handover using a dedicated signaling channel (dsch), a dedicated traffic channel (dtch) and a dedicated MAC (Medium Access Control) channel (dmch), it makes the transition from one state to another state while maintaining one or more channels to the BSC during a handover. Accordingly, the movement of the mobile in the above states can be continuously traced by the BSC.

However, if the mobile enters a dormant state where transmission and reception of traffic is not performed because no packet data is transmitted for a predetermined time, there exists no connection between the mobile and the BSC, making it impossible to manage the location in the same way as done in the active state and the control hold state.

The dormant state means a state where such traffic as voice and packet data is not generated in a state where a radio channel is established. When the dormant state occurs, the wireless packet data system manages a location of the packet call in the dormant state to prepare for later resumption of the traffic. For this reason, the conventional wireless packet data system proposes the following four plans of managing a packet call in the dormant state, and adopts one of them.

In a first proposed plan, a home location register (HLR) and a visitor location register (VLR) take exclusive charge of the location management of a call, and a base station system (BSS) deletes all information on a call that enters the dormant state. In this case, when a packet call in the dormant state requests transmission of the packet data, the same process as a normal new call setup process is performed. That is, an initial call setup process, a registration process and an authentication process are all performed. As a result, an exchange of radio messages due to the call setup process increases a load on an RF (Radio Frequency) stage, and brings about processing loads on the VLR/HLR/AC (Authentication Center) due to the registration and authentication processes. In addition, performing the complicated call setup process causes an increase in a packet buffering time, thus increasing a delay time. In particular, it is difficult to trace a location of the mobile existing in the dormant state, so that a paging load may increase when there is a request for an incoming call to the mobile from the network.

A second proposed plan is to compensate for the disadvantages of the first proposed plan. This plan provides a plurality of the VLRs/HLRs in order to decrease the processing loads caused because the single VLR/HLR performs the location management. In this plan, location management of the users is not processed in the single VLR/HLR, but the mobility of all the mobiles is processed by the plurality of the VLRs/HLRs on a load shared basis. Therefore, the BSCs draw the VLR/HLR managing the location information of the corresponding mobile using an identifier (ID) of the mobile, and then acquire the mobile information through the corresponding VLR/HLR. However, as the second plan is fundamentally performed in the same procedure as the first plan, the second plan is somewhat effective in decreasing the load on the VLR/HLR but still has the other disadvantages.

A third proposed plan stores an ID of a source BSC (hereinafter, referred to as an "initial BSC") initially accessed by the mobile for a packet data service until the call is released, and performs location management and dormant state management of the corresponding mobile by utilizing the stored information. That is, when the mobile is activated in the dormant state, the mobile provides the ID of the initially accessed BSC (initial BSC) to a newly accessed BSC (hereinafter, referred to a "target BSC"). In this case, when processing a registration message of the mobile, the target BSC can rapidly access a dormant state database (DB) of the mobile whose packet service is activated. However, to this end, the radio interface standard must be changed undesirably. That is, the message format must be changed such that the mobile can transmit the ID of the initial BSC to the target BSC.

A fourth proposed plan is to newly construct a small-scale VLR unlike the VLR/HLR connected to a mobile switching center (MSC), and arrange the small-scale VLR in a network where a new server exclusively managing the dormant state is constructed as a BSC. That is, the small-scale VLR is arranged in a network where a separate server is constructed as a BSC, and the BSCs acquire and update the information on the data service call in the dormant state from the separate server. In this case, it is annoyingly necessary to construct separate hardware, and guarantee the VLR/HLR-level safety to the new device. In addition, from a viewpoint of the BSS, there exists an overhead that the BSS should simultaneously register all the registration messages in the MSC and the separate server as well.

SUMMARY OF THE INVENTION

It is, therefore, an object of the present invention to provide an apparatus and method for effectively embodying a packet data service without a separate device and modification of the radio interface standard in a wireless packet data system.

It is another object of the present invention to provide an apparatus and method for managing mobiles in a dormant state in a BSC, thereby enabling termination of a packet call to the mobile and rapid reconnection.

It is further another object of the present invention to provide an apparatus an method for enabling reconnection to a previous PPP (Point-to-Point Protocol) access point in a BSC, upon receipt of a call originated from a mobile in a dormant state.

It is yet another object of the present invention to provide an apparatus and method for readily performing a service for managing a mobile in a dormant state even though traffic through an IP (Internet Protocol) network becomes larger than a capacity of a voice call.

It is still another object of the present invention to provide an apparatus and method in which when an error occurrs in a certain BSC it does not affect a service performed by another BSC.

It is still another object of the present invention to provide an apparatus and method in which BSCs have search and addition/deletion functions for effective database management by maintaining information on the maximum number of mobiles in the dormant state.

It is still another object of the present invention to provide an apparatus and method for managing information regarding a dormant state of a terminal (or mobile station) in the dormant state in a distributed database manner.

It is still another object of the present invention to provide an apparatus and method for managing information about a call of a terminal in a dormant state by a source base station controller, and information regarding the dormant state of the terminal in the dormant state by a target base station controller, respectively.

It is still another object of the present invention to provide an apparatus and method for managing information about a call of a terminal in a dormant state by a source base station controller, and information regarding the dormant state of the terminal in the dormant state by a pointer lookup base station controller, respectively.

In accordance with one aspect of the present invention, the above and other objects can be accomplished by the provision of a method for managing call information associated with a plurality of mobile stations by a plurality of base station controllers in a wireless mobile telecommunications system including the base station controllers each adapted to provide packet data services for the terminals and provided with a packet data processor, each of the packet data services being performed between the base station controllers and the terminals via the packet data processor of an associated one of the base station controllers and a packet network connected to the packet data processor, comprising the steps of: if a source one of the base station controllers receiving a call request message from a given one of the mobile stations makes a transition to a dormant state in which a packet data service performed by the source base station controller is suspended, then sending an identifier of the given terminals and an identifier of the source base station controller to the remaining ones of the base station controllers; and controlling each of the remaining base station controllers to store the identifier of the given mobile station and the identifier of the source base station controller in a pointer lookup table.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
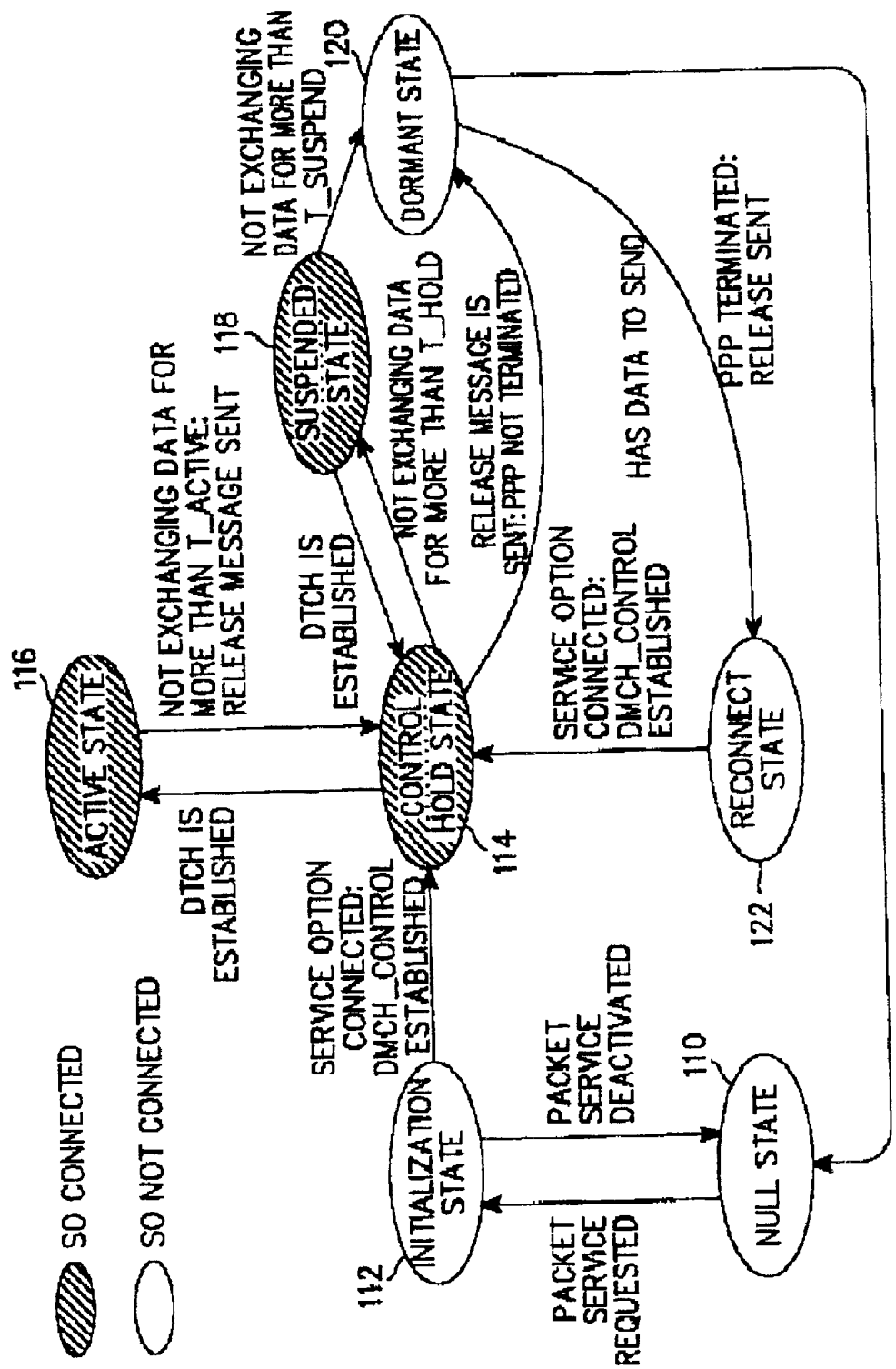
FIG. 1 is a view illustrating state transitions in a mobile telecommunications system in accordance with a preferred embodiment of the present invention.

A preferred embodiment of the present invention will be described herein below with reference to the accompanying drawings. In the following description, well-known functions or constructions are not described in detail since they would obscure the invention in unnecessary detail. In addition, the present invention can be applied to any wireless packet data system supporting a high-speed packet data service having the "packet activation" and "packet deactivation" attributes such as an IS-95B system, as well as the future mobile communication system such as the CDMA-2000 system and the W-CDMA system.

Herein, the invention will be described with reference to a CDMA-2000 system by the TIA (Telecommunication Industry Association) standard, and the "mobile communication system" refers to a CDMA system.

A channel structure of the CDMA-2000 system to which the present invention is applied is divided into logical channels and physical channels. In this case, the major logical channels and the major physical channels used by a MAC (Medium Access Control) channel of the CDMA-2000 system are defined as follows. For convenience, a prefix "r-" will be attached to reverse channels, while a prefix "f-" will be attached to forward channels.

First, a function of the logical channels will be described in detail.

A dedicated signaling channel (dsch) is exclusively assigned to a specific mobile only in the active state and the control hold state. In addition, the dsch is used for transmitting and receiving an L3/Call-Control control message.

A dedicated MAC channel (dmch) is also exclusively assigned to a specific mobile only in the active state and the control hold state. In addition, the dmch is used for transmitting and receiving a control message of a MAC layer to control a dedicated traffic channel dtch, and chiefly manages 5 ms-messages.

A common MAC channel (cmch) is commonly assigned to a plurality of mobiles only in the suspended state and the dormant state. In addition, the cmch is used for transmitting and receiving a control message of the MAC layer.

A dedicated traffic channel (dtch) is exclusively assigned to a specific mobile only in the active state, and used for transmitting and receiving the traffic.

A common traffic channel (ctch) is commonly assigned to a plurality of mobiles only in the dormant state, and used for transmitting and receiving the traffic.

Next, a function of the physical channels will be described in detail.

A dedicated control channel (DCCH) is exclusively assigned to a specific mobile to control the mobile. In addition, the DCCH supports a DTX (Discontinuous Transmission) mode where the channel band is used only when there exists the traffic to transmit. The respective users share one code by using different orthogonal long codes.

A common control channel (CCCH) is acquired by a plurality of mobiles through competition, and is mapped with the logical channel cmch.

A fundamental channel (FCH) is a channel provided considering reverse compatibility with the IS-95 system, and can be utilized for transmitting and receiving traffic control information like the conventional IS-95 fundamental channel.

A supplemental channel (SCH) is a channel corresponding to the IS-95B supplemental channel, and is based on an outband technique for chiefly transmitting traffic. The SCH supports a scheme which is dynamically assigned or released by the logical channel dmch.

FIG. 1 illustrates state transitions of a MAC layer in a mobile communication system according to an embodiment of the present invention. Referring to FIG. 1, the MAC layer has a different state according to a channel holding state, and each state transition takes place through a timer or an artificial primitive. The respective states shown in FIG. 1 will be described below.

A null state 110 is a pre-call setup state where there is no connection and no information. An initialization state 112 is a state where negotiations are carried out at an initialization request of a packet service, and in this state, call processing and various negotiations are performed through the common channel. A control hold state 114 is a state where the dedicated control channels dsch/dmch are established after the channel negotiation. In this case, the traffic channel is immediately assigned through foe dmch. An active state 116 is a state where due to deactivation of the traffic, the dedicated traffic channel dtch is assigned through the dmch, and then, the traffic is transmitted and received through the assigned channel. A suspended state 118 is a state where the dedicated channels dsch/dmch are released and various control information is transmitted and received through the common channel. A dormant state 120 is a state where due to non-traffic exchange for a long period of time, every channel under the layer 2 is released and all the information is removed. In this state, only the PPP-related access information is managed. Finally, a reconnect state 122 is a state to which transition occurs if transmission traffic is generated in the dormant state 120, and in this state, the same procedure as the initial call setup procedure is performed except for the fact that the PPP information is maintained.

Meanwhile, the state transitions take place based on a timer, as shown in FIG. 1. That is, transition to the control hold state 114 happens only when no traffic is exchanged for a set time T_active after transition to the active state 116 by acquiring the dedicated traffic channel in the control hold state 114. When no traffic is exchanged for a set time T_hold in the control hold state 114, transition occurs to the suspended state 118. If the non-traffic state is maintained until expiration of a set time T_suspend in the suspended state 118, transition to the dormant state 120 takes place. Although the state transition diagram of FIG. 1 includes the suspended state 118, an embodiment of the invention can also be applied to a system excluding the suspended state. In this case, if no traffic is generated for the set time T_active in the active state 116, transition will happen to the dormant state 120 through the control hold state 114.

Figure 2:
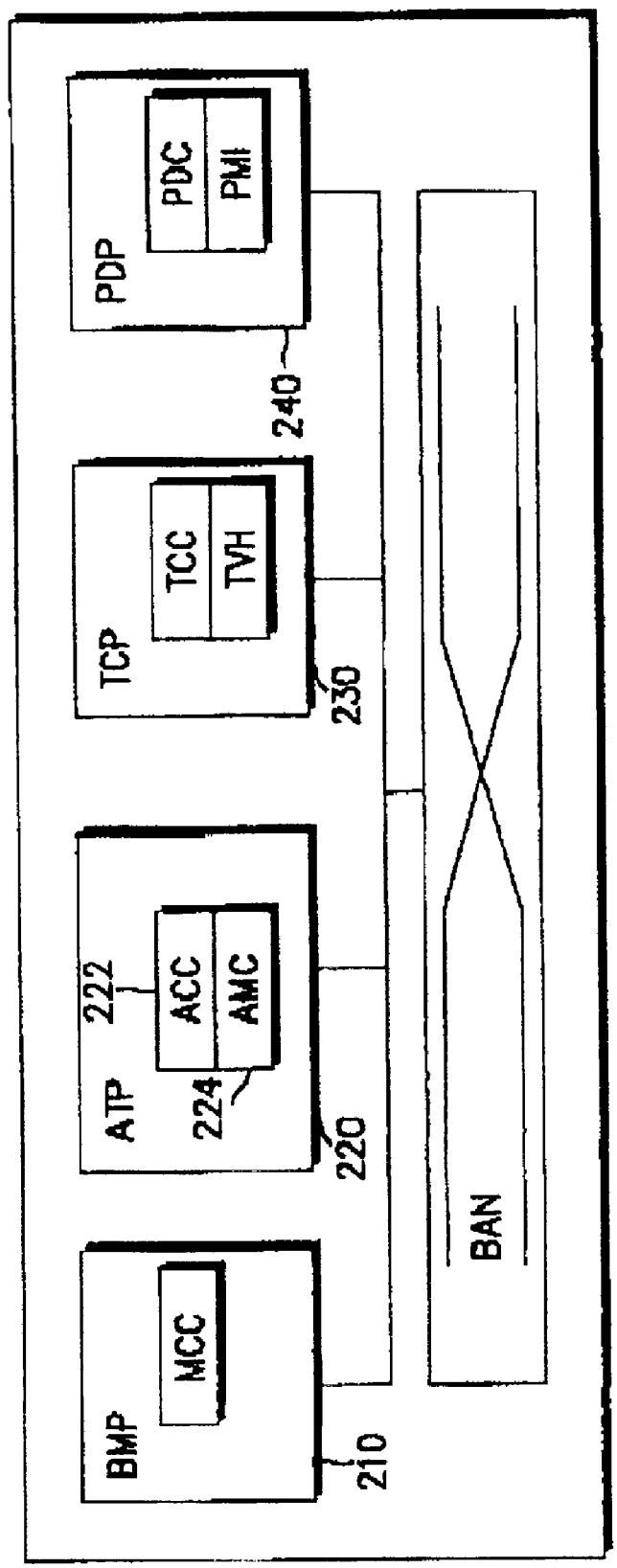
FIG. 2 is a block diagram showing the construction of a base station controller for supporting a packet service to be implemented in the [present invention] prior art.

With reference to FIG. 2, there is schematically shown in block form the construction of a base station controller (BSC) for supporting a packet service to be implemented in the prior art. As shown in this drawing, the BSC comprises main modules as described below.

A BSC master processor (BMP) 210 is adapted to intervene in the entire call control operation to perform signaling with a mobile switching center (MSC), control an asynchronous transfer mode (ATM) switch and act as a master associated with system maintenance.

An air termination processor (ATP) 220 functions to process main media (signals, packet data and circuit data) in the BSC. The ATP 220 acts as an anchor point within a predetermined area for a packet service, and acts as an anchor point for a call duration of a terminal (or mobile station (MS)) while in transit for a circuit service. In particular, in order to include a scheme proposed in the present invention, the ATP 220 is provided with an ATP call control (ACC) unit 222 for performing a signaling link access control (LAC) operation on a dedicated signaling channel (dsch) which partially controls inband layer-3 signaling, and an ATP media control (AMC) unit 224 for performing a main function of a media access control (MAC) layer and providing an interface with a point-to-point protocol (PPP).

A transcoder processor (TCP) 230 functions to control and process voice data according to a vocoding algorithm for voice frame processing.

A packet data processor (PDP) 240 is connected to a terminal identifier (Mobile-ID) network to act as a gateway or interworking unit for a packet data service. The terminal identifier network is a packet network which provides a packet service to a terminal.

Figure 3:
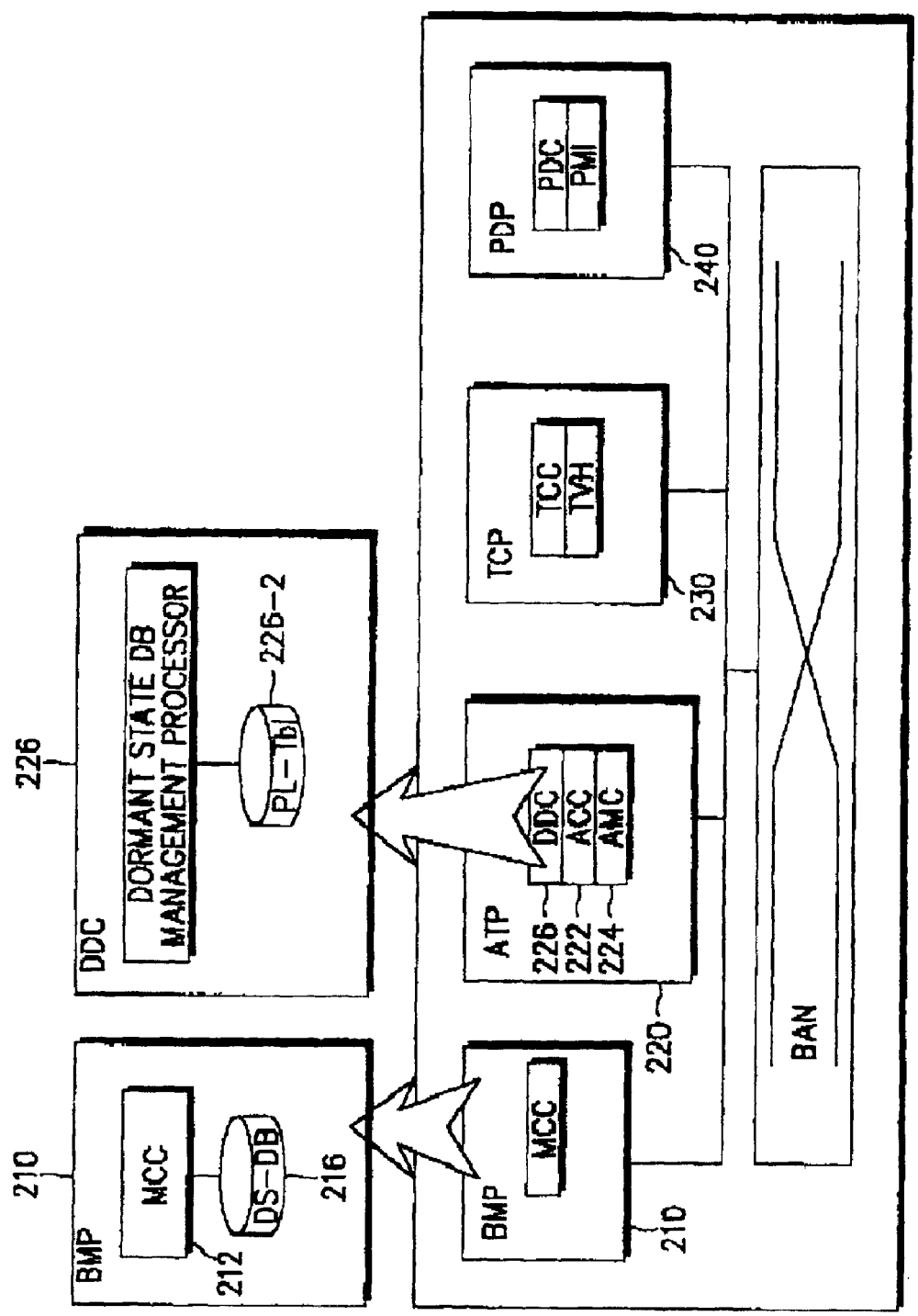
FIG. 3 is a block diagram showing the construction of a base station controller in accordance with the preferred embodiment of the present invention.

FIG. 3 is a block diagram showing the construction of a BSC in accordance with the preferred embodiment of the present invention. In the present embodiment, as shown in FIG. 3, additional modules are provided in the BSC, resulting in no necessity for modifying other components, or an MSC/VLR/HLR and terminal. Further, in this embodiment, the additional modules can be developed as software within boards of the ATP 220 and BMP 210 such that they can be very easily developed.

The additional modules according to the preferred embodiment of the present invention will hereinafter be described in more detail with reference to FIG. 3. The BMP 210 includes a main call control (MCC) unit 212 for intervening in the entire call control operation to perform signaling, and a dormant state database (DS-DB) 216 for managing information about a call provided from the MCC 212.

In the present embodiment, the call information contains a terminal identifier (mobile ID), an ATP ID, location information, a PPP address, a PPP ID and a service option of a corresponding mobile terminal.

The following table 1 shows an exemplary storage structure of the DS-DB 216.

TABLE 1

| MOBILE ID | ATP ID | LOCATION INFORMATION | PPP ADDRESS | PPP ID | SERVICE OPTION |
|---|---|---|---|---|---|
| MOBILE ID #1 | ATP ID #1 | LOCATION INFORMATION #1 | PPP ADDRESS #1 | PPP ID #1 | SERVICE OPTION #1 |
| MOBILE ID #2 | ATP ID #2 | LOCATION INFORMATION #2 | PPP ADDRESS #2 | PPP ID #2 | SERVICE OPTION #2 |
| MOBILE ID #3 | ATP ID #3 | LOCATION INFORMATION #3 | PPP ADDRESS #3 | PPP ID #3 | SERVICE OPTION #3 |
| MOBILE ID #4 | ATP ID #4 | LOCATION INFORMATION #4 | PPP ADDRESS #4 | PPP ID #4 | SERVICE OPTION #4 |
| ... | ... | ... | ... | ... | ... |
| MOBILE ID #N | ATP ID #N | LOCATION INFORMATION #N | PPP ADDRESS #N | PPP ID #N | SERVICE OPTION #N |

In the above table 1, the mobile ID is information used to identify a corresponding terminal, which information may preferably contain an electronic serial number/mobile identification number (ESN/MIN). The ATP ID is information used to identify an ATP for supporting a service corresponding to the above mobile ID, from among a plurality of ATPs provided in the BSC. The location information is used to indicate the location of a terminal corresponding to the above mobile ID. The PPP ID is information used to designate a PPP assigned to an interworking function (IWF) for provision of a packet data service to the above PPP address. The PPP address is information indicative of the location of the above PPP ID. Finally, the service option is information required to provide a service corresponding to the call.

The above-listed call information is the same as that used for conventional call management by the HLR/VLR. In the present invention, such information is not only stored and managed in the DS-DB 216, but also managed in the HLR/VLR in the conventional manner.

On the other hand, provided in the ATP board 220 is a dormant state database management control (DDC) unit 226 which is a module for performing a location management function. The DDC unit 226 includes a pointer lookup table (PL-Tbl) 226-2 for managing information regarding a call entering the dormant state 120. The information managed in the PL-Tbl 226-2 contains a mobile ID corresponding to the call entering the dormant state 120, and a source BSC ID corresponding to that mobile ID.

The below table 2 shows an exemplary storage structure of the PL-Tbl 226-2.

TABLE 2

| MOBILE ID | SOURCE BSC ID |
|---|---|
| MOBILE ID #1 | SOURCE BSC ID #1 |
| MOBILE ID #2 | SOURCE BSC ID #2 |
| MOBILE ID #3 | SOURCE BSC ID #3 |
| ... | ... |
| MOBILE ID #N | SOURCE BSC ID #N |

In the above table 2, the mobile ID is information used to identify a corresponding terminal, which information may preferably contain an electronic serial number/mobile identification number (ESN/MIN), as stated above. The source BSC ID is information used to designate a source BSC having call information corresponding to the above mobile ID, stored therein.

In the present invention, a BSC starting an initial packet service in a specific MSC with respect to a call originating terminal is referred to as a source BSC, and BSCs in the specific MSC, other than a source BSC corresponding to a terminal entering the dormant state 120, are referred to as target BSCs corresponding to that terminal. On the other hand, the BMP 210 in the source BSC stores and manages call information in the DS-DB 216, as stated above, and the DDC 226 in each target BSC stores and manages information of a terminal entering the dormant state 120 in the PL-Tbl 226-2, as stated above.

In other words, all BSCs in a specific MSC include the DS-DB 216 and PL-Tbl 226-2. If any one of the BSCs is designated as a source BSC for a specific terminal, then it manages call information in the DS-DB 216. If any one of the other BSCs is designated as a target BSC for a terminal entering the dormant state 120, then it manages dormant state information in the PL-Tbl 226-2. As a result, all BSCs function as either source BSCs or target BSCs according to given conditions.

Now, a detailed description will be given of the operation of the base station controller with the above-stated construction in accordance with the preferred embodiment of the present invention under the condition that it is classified into processes for initial packet service activation, packet service call origination, packet service call termination, and terminal location registration. It should be noted herein that, for implementation of the present embodiment, BSCs affiliated with one MSC exchange information with one another via a certain interface, which complies with "A7-interface" prescribed in "IS-634".

Firstly, for the initial packet service activation process, a source BSC receiving an initial packet service request from a terminal constructs a DS-DB corresponding to the terminal and then provides a packet service thereto. Where the terminal makes a transition to a dormant state during the packet service provision, information regarding the dormant state of the terminal is provided to the other BSCs belonging to the same MSC such that the other BSCs construct PL-Tbls with the provided dormant state information.

The initial packet service activation process will hereinafter be described in more detail with reference to FIG. 4 which is a view illustrating an initial packet call establishment operation, FIG. 8 which is a flowchart illustrating a control operation of a source BSC, and FIG. 9 which is a flowchart illustrating a control operation of a target BSC.

Figure 4:
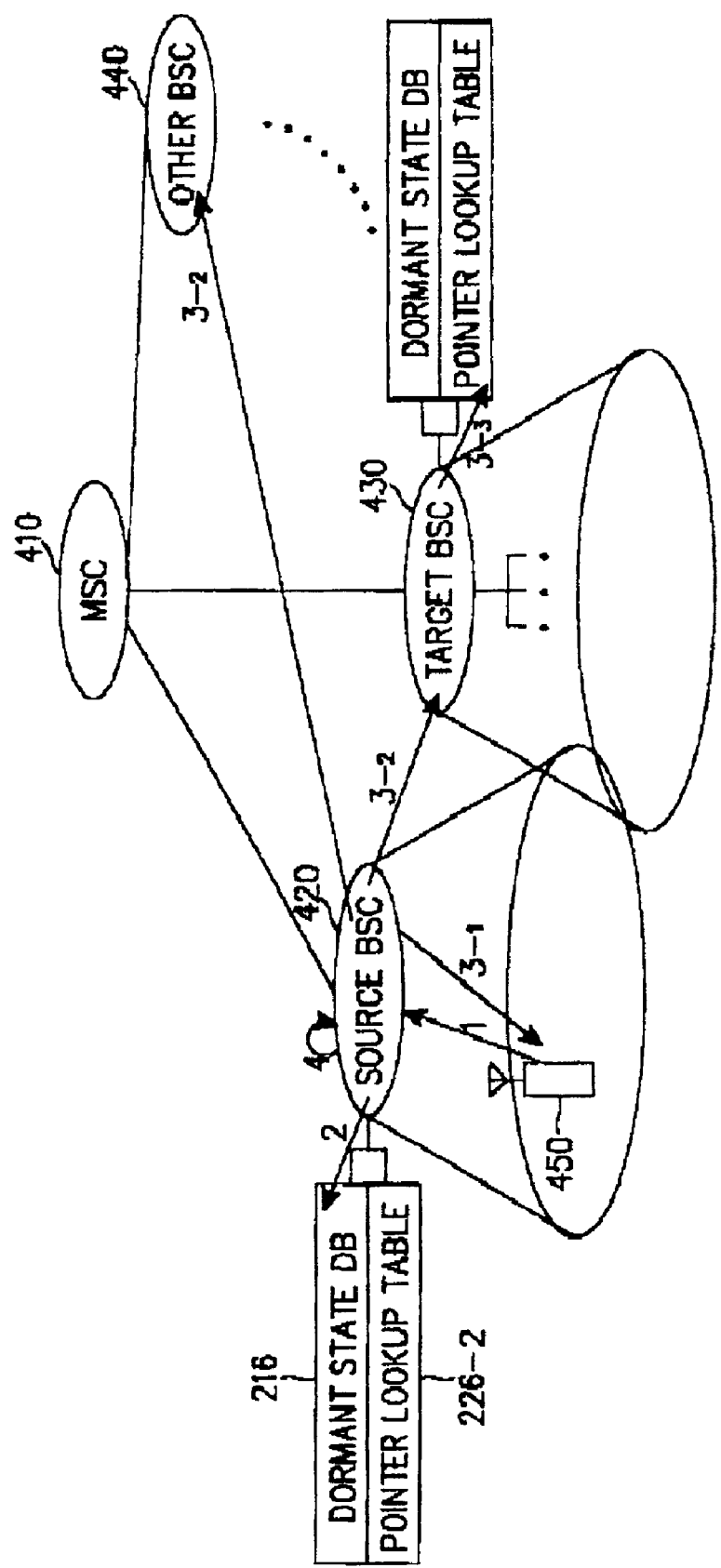
FIG. 4 is a view illustrating a process for initial packet service activation in accordance with the preferred embodiment of the present invention.
Figure 8:
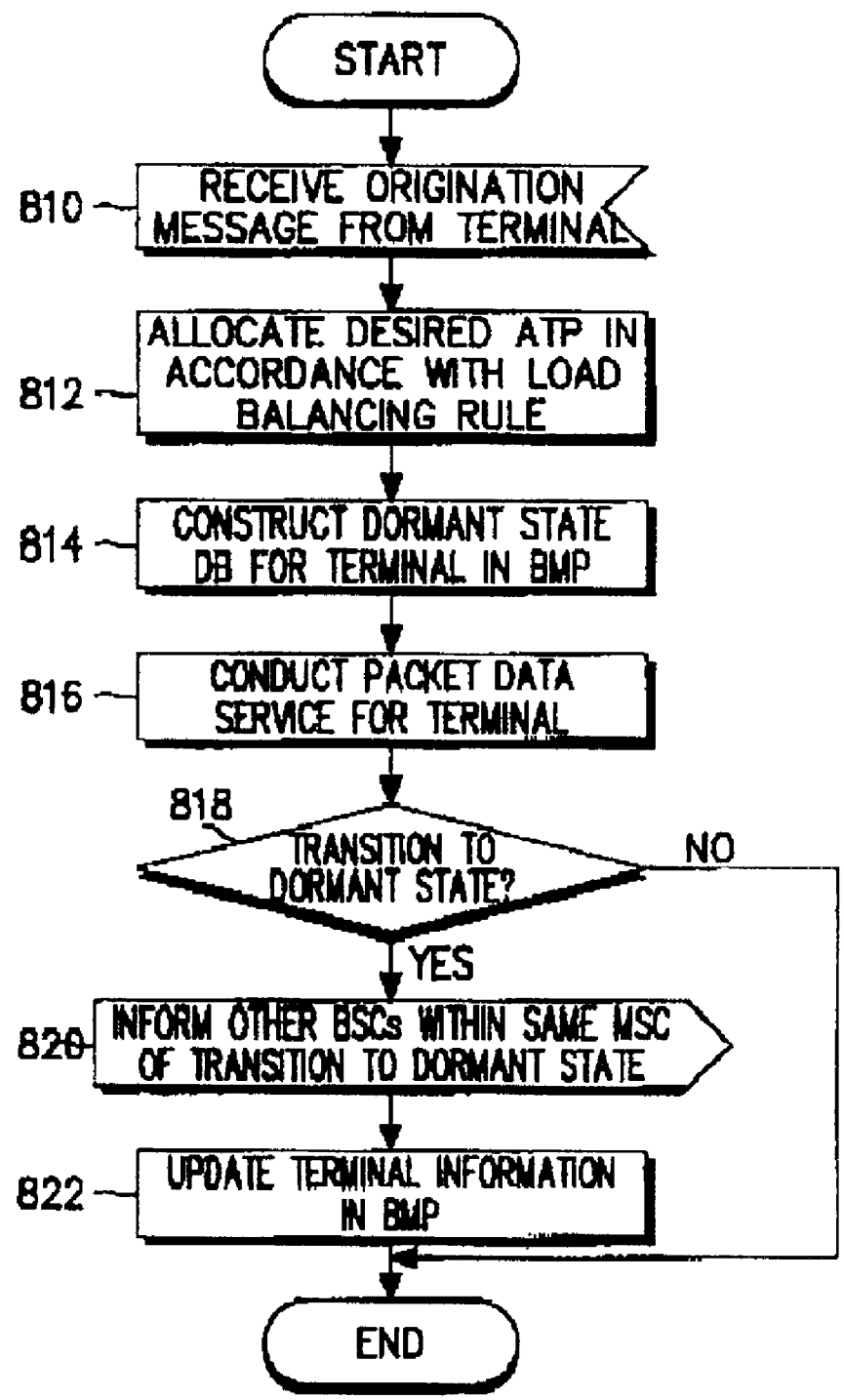
FIG. 8 is a flowchart illustrating a control operation of a source base station controller for the initial packet service activation in accordance with the preferred embodiment of the present invention.

If a terminal 450 sends an origination message to attempt an initial PPP connection for a packet service at step 1 of FIG. 4, then a BSC receiving the origination message is designated as a source BSC 420 (step 810 of FIG. 8).

The source BSC 420 selects a specific ATP 220 for provision of the packet service to the terminal 450 from among a plurality of ATPs therein according to a load balancing rule and allocates the selected ATP 220 to the terminal 450 (step 812 of FIG. 8). After the ATP 220 is allocated to the terminal 450, a BMP 210 of the source BSC 420 receiving the origination message constructs a DS-DB 216 with call information corresponding to the terminal 450 at step 2 of FIG. 4 (step 814 of FIG. 8). For the construction of the DS-DB 216, determinations must be made as to a PPP address and PPP ID of an IWF (not shown). Further, although not shown, the source BSC 420 has to provide the call information of the DS-DB 216 to an MSC 410 to separately manage it in an HLR/VLR.

If the construction of the DS-DB 216 is completed, then the source BSC 420 provides the packet service to the terminal 450 according to a typical standard (step 816 of FIG. 8).

On the other hand, while providing the packet service to the terminal 450, the source BSC 420 continuously monitors packets being sent and received to/from the terminal 450 to determine whether the terminal 450 makes a transition to the dormant state (step 818 of FIG. 8).

Upon determining that the terminal 450 makes a transition to the dormant state, the source BSC 420 sends a release message to the terminal 450 at step 3-1 of FIG. 4 and transfers dormant state information (containing, for example, a mobile ID and source BSC ID) based on the dormant state transition of the terminal 450 to the other BSCs 430 and 440 in the same MSC 410 at step 3-2 of FIG. 4.

Through these steps, the BSC 420 can notify the other BSCs 430 and 440 that it is the source BSC for the terminal 450 (step 820 of FIG. 8). After transferring the dormant state information, the source BSC 420 updates the terminal information in the DS-DB through an MCC 212 (step 822 of FIG. 8).

Figure 9:
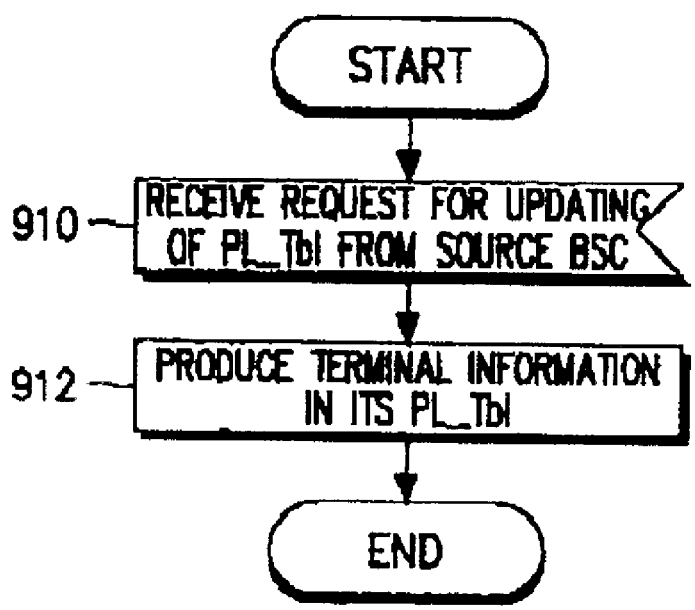
FIG. 9 is a flowchart illustrating a control operation of a target base station controller for the initial packet service activation in accordance with the preferred embodiment of the present invention.

Upon receiving the dormant state information from the source BSC, the other BSCs 430 and 440 construct PL-Tbls 226-2 with the received dormant state information by DDCs 226 in their ATPs 220 (steps 910 and 912 of FIG. 9). Each of the constructed PL-Tbls 226-2 includes a mobile ID and a source BSC ID corresponding thereto.

In this manner, all terminals entering the dormant state are managed in PL-Tbls of all BSCs in the same MSC 410, including source BSCs, under the condition that their PPPs managed in the PL-Tbls remain active.

Secondly, for the packet service call origination process, a target BSC receiving an origination message from a terminal in the dormant state searches a PL-Tbl therein for a source BSC for the terminal and requests call information from the searched source BSC. The target BSC then provides a packet service to the terminal on the basis of the call information which is provided from the source BSC in response to the request.

Figure 10:
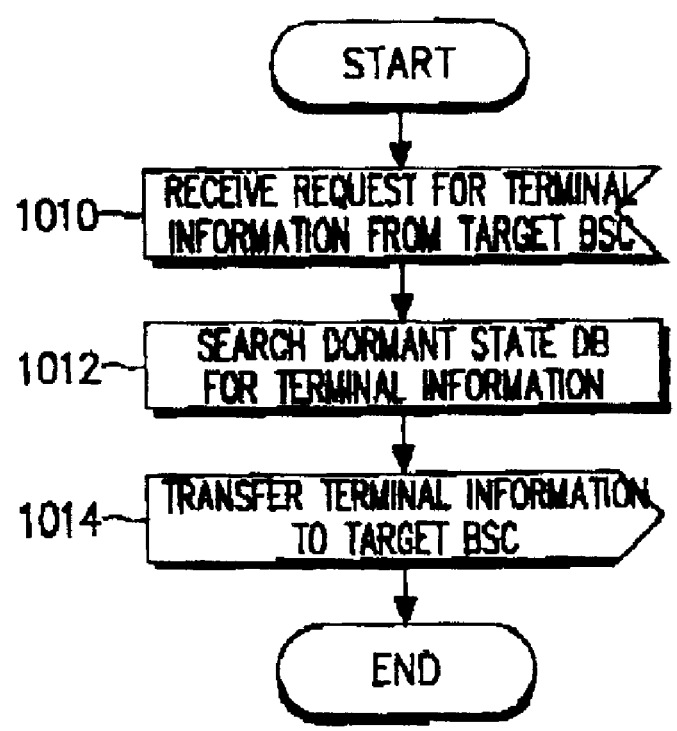
FIG. 10 is a flowchart illustrating a control operation of the source base station controller for the packet service call origination in accordance with the preferred embodiment of the present invention.
Figure 11:
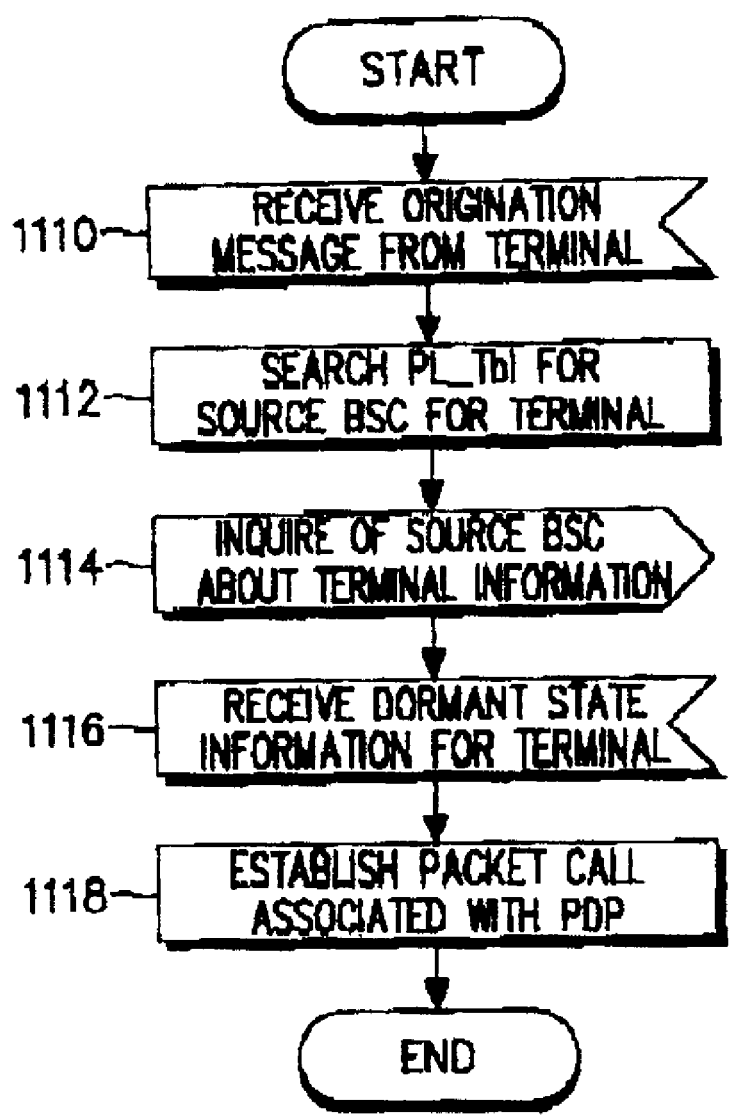
FIG. 11 is a flowchart illustrating a control operation of the target base station controller for the packet service call origination in accordance with the preferred embodiment of the present invention.

The packet service call origination process will hereinafter be described in more detail with reference to FIG. 5 which is a view illustrating the packet service call origination process, FIG. 10 which is a flowchart illustrating a control operation of a source BSC, and FIG. 11 which is a flowchart illustrating a control operation of a target BSC.

Where the dormant-state terminal 450 registered in the PL-Tbl 226-2 by the process described above referring to FIG. 4 moves from a service area of the source BSC 420 to a different BSC (i.e., performs a handover operation) and then sends an origination message to the different BSC to resume the packet service, the different BSC receiving the origination message becomes a target BSC 430 (step 1110 of FIG. 11).

Figure 5:
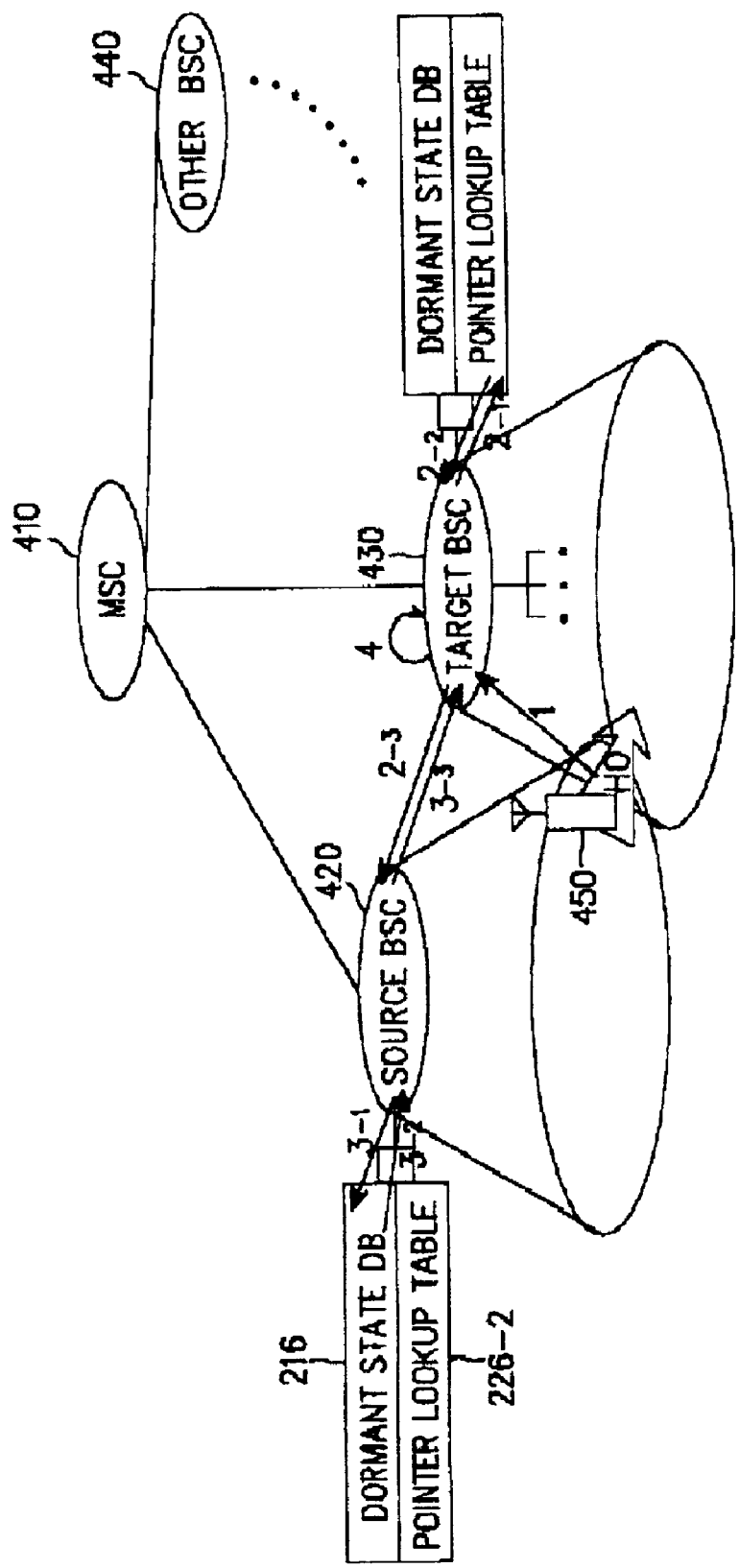
FIG. 5 is a view illustrating a process for packet service call origination in accordance with the preferred embodiment of the present invention.

The DDC 226 in the target BSC 430 receiving the origination message at step 1 of FIG. 5 searches the PL-Tbl 226-2 using the mobile ID of the terminal 450 at step 2-1 of FIG. 5 and then extracts a source BSC ID corresponding to the mobile ID from the PL-Tbl 226-2 at step 2-2 of FIG. 5 (step 1112 of FIG. 11).

After extracting the source BSC ID at the above step 2-2, the target BSC 430 requests call information of the terminal 450 from the source BSC 420 corresponding to the extracted source BSC ID (step 1114 of FIG. 11).

Upon receiving the call information request from the target BSC, the source BSC 420 searches the DS-DB 216 in the BMP 210 for the call information corresponding to the mobile ID at step 3-1 of FIG. 5 (steps 1010 and 1012 of FIG.

10). If the source BSC 420 completes the search for the corresponding call information at step 3-2 of FIG. 5, then it transfers the searched call information to the target BSC 430 at step 3-3 of FIG. 5 (step 1014 of FIG. 10).

If the target BSC 430 receives the desired call information at the above step 3-3, then it connects its internal PDP 240 to a network using the received call information at step 4 of FIG. 5 so as to connect a packet call to the terminal 450 (step 1118 of FIG. 11).

As a result, the terminal 450 in the dormant state is managed by all BSCs in the same MSC, thereby enabling the packet service to be resumed using information before the terminal enters the dormant state.

Thirdly, for the packet service call termination process, if a call from an MSC incomes to a dormant-state terminal located in a target BSC, a source BSC informs a target BSC of call termination with reference to a DS-DB and the target BSC provides the incoming call to the terminal. As a result, a packet service is provided to the terminal in response to an acknowledgement message therefrom.

Figure 6:
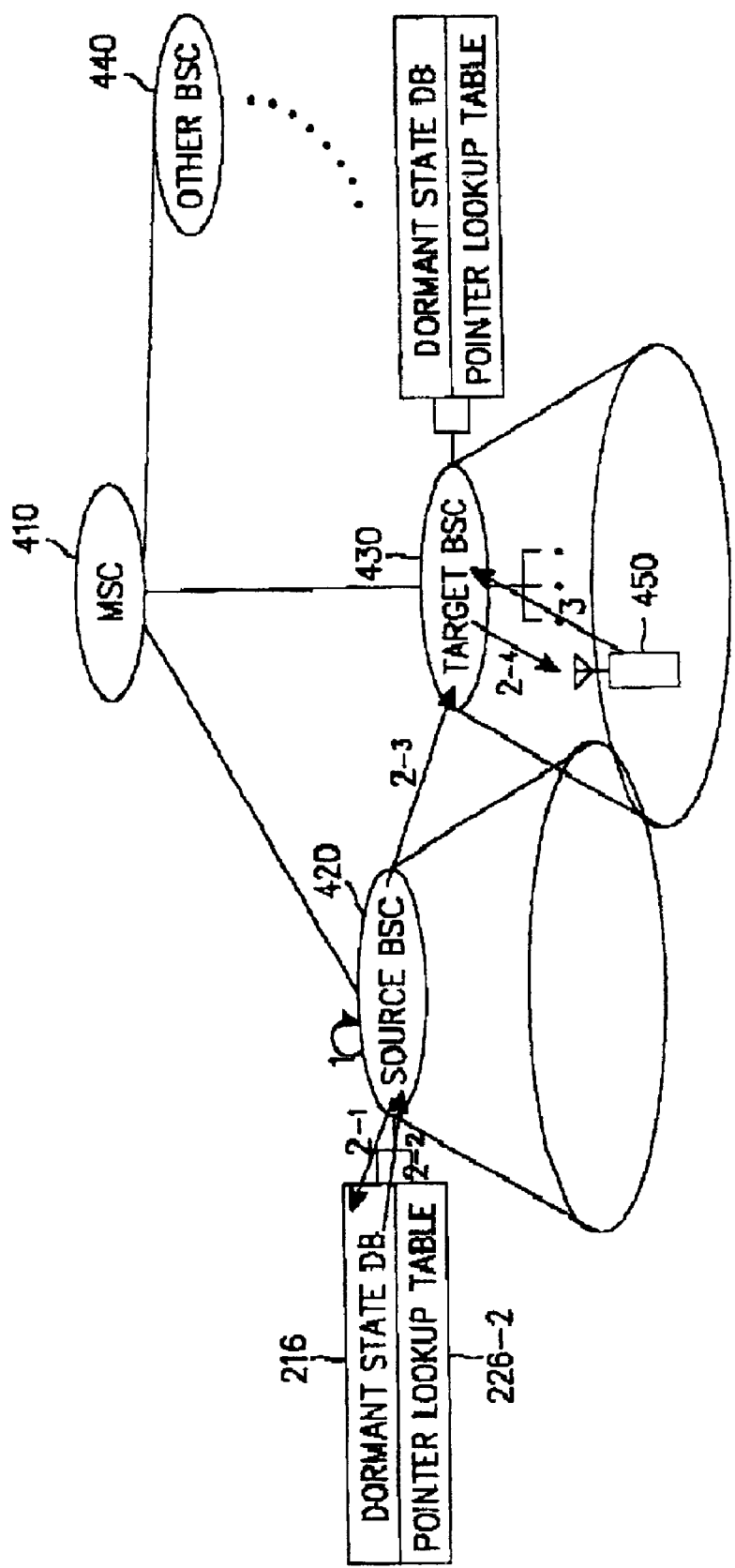
FIG. 6 is a view illustrating a process for packet service call termination in accordance with the preferred embodiment of the present invention.
Figure 12:
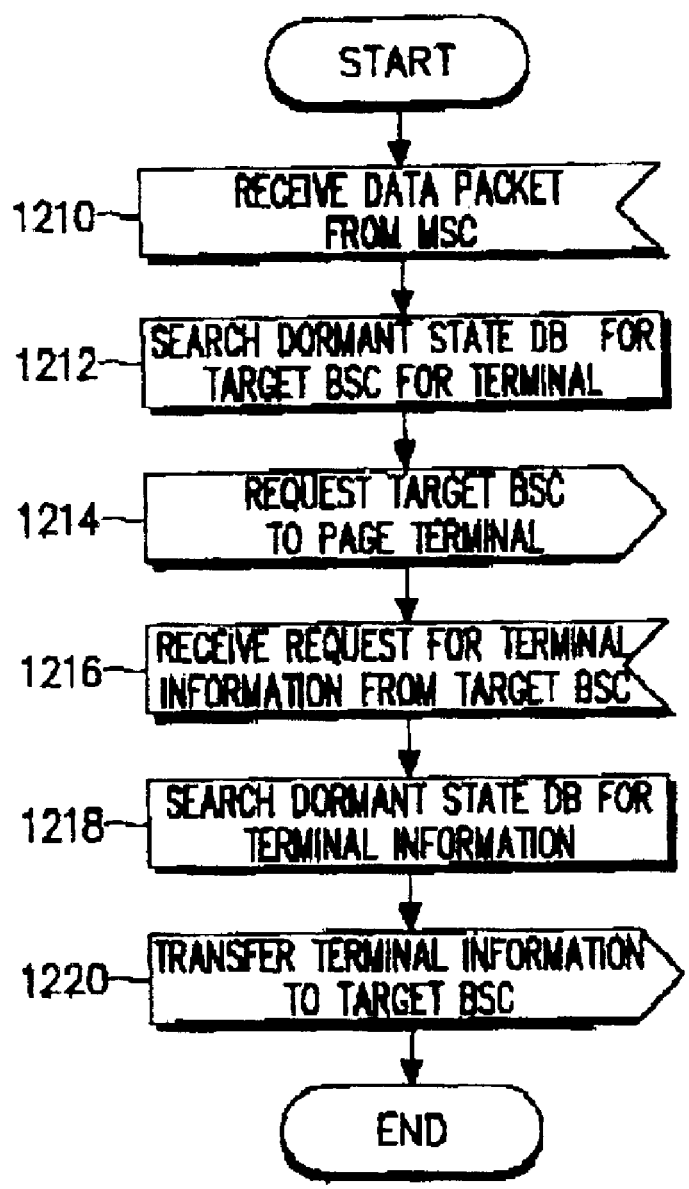
FIG. 12 is a flowchart illustrating a control operation of the source base station controller for the packet service call termination in accordance with the preferred embodiment of the present invention.

The packet service call termination process will hereinafter be described in more detail with reference to FIG. 6 which is a view illustrating the packet service call termination process, FIG. 12 which is a flowchart illustrating a control operation of a source BSC, and FIG. 13 which is a flowchart illustrating a control operation of a target BSC.

Where call termination from the MSC 410 to the terminal 450 via a certain PPP is requested, the PDP 240 in the source BSC 420 sends a setup message to the ATP 220 at step 1 of FIG. 6 (step 1210 of FIG. 12).

Upon receiving the setup message from the PDP 240, the ATP 220 sends a connection setup request message 'SO Connect Request' to the BMP 210. If the BMP 210 receives the connection setup request message from the ATP 220, then it searches its DS-DB 216 for information about a target BSC in which the terminal 450 is located, at step 2-1 of FIG. 6, and extracts the searched information from the DS-DB 216 at step 2-2 of FIG. 6 (step 1212 of FIG. 12).

The target BSC information is determined depending on location information managed in the DS-DB 216.

After confirming through the DS-DB 216 the target BSC 430 in which the terminal 450 is located, the BMP 210 sends a paging request to the target BSC to page the terminal 450, at step 2-3 of FIG. 6 (step 1214 of FIG. 12). Where the BMP 210 fails to receive a paging request acknowledgement (Ack) message from the terminal 450 for a predetermined period of time, it executes a secondary paging algorithm.

Figure 13:
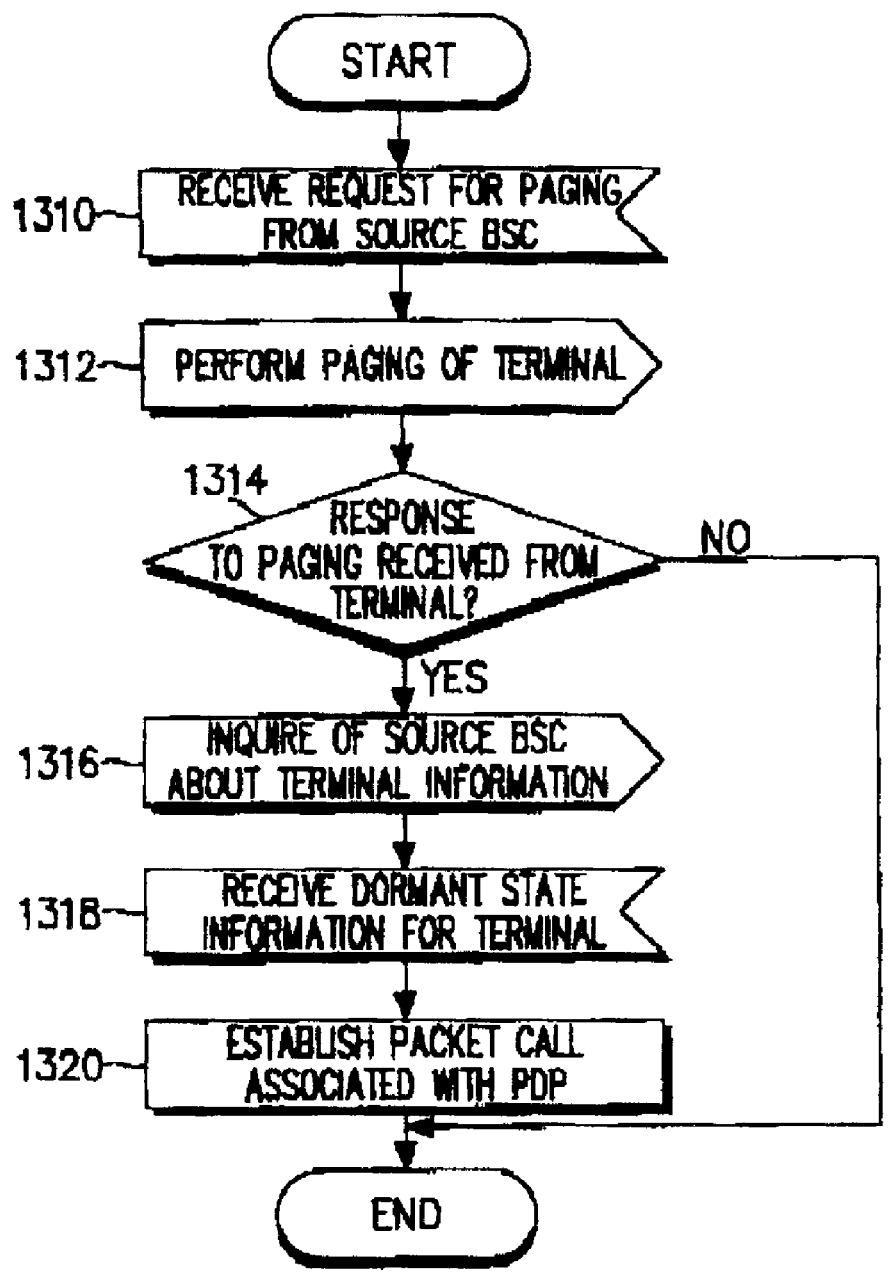
FIG. 13 is a flowchart illustrating a control operation of the target base station controller for the packet service call termination in accordance with the preferred embodiment of the present invention.

If the target BSC 430 receives the paging request from the BMP 210 in the source BSC 420 at the above step 2-3, then it pages the terminal 450 at step 2-4 of FIG. 6 (steps 1310 and 1312 of FIG. 13).

Upon being paged by the target BSC 430, the terminal 450 sends a paging response to the target BSC 430 at step 3 of FIG. 6. The target BSC 430 receives the paging response from the terminal 450 at step 1314 of FIG. 13 and then establishes a packet call in the same order as the above-stated call origination-based packet service provision procedures (steps 1114 to 1118 of FIG. 11) through steps 1316 to 1320 of FIG. 13. On the other hand, the source BSC 420 establishes a packet call in the same order as the above-stated call origination-based packet service provision procedures (steps 1010 to 1014 of FIG. 10) through steps 1216 to 1220 of FIG. 12.

Fourthly, for the dormant-state terminal location registration process, if a target BSC receives a registration message resulting from a handover of a dormant-state terminal, then it provides updated location information to a source BSC with reference to a PL-Tbl such that the source BSC updates terminal location information registered in a DS-DB.

The terminal location registration process based on the handover of the dormant-state terminal will hereinafter be described in more detail with reference to FIG. 7 which is a view illustrating the terminal location registration process, FIG. 14 which is a flowchart illustrating a control operation of a source BSC, and FIG. 15 which is a flowchart illustrating a control operation of a target BSC.

An idle handover is carried out if the dormant-state terminal 450 moves from the source BSC 420 to the target BSC 430. Because of this handover, the terminal 450 sends a registration message at step 1-1 of FIG. 7 (step 1510 of FIG. 15).

Figure 7:
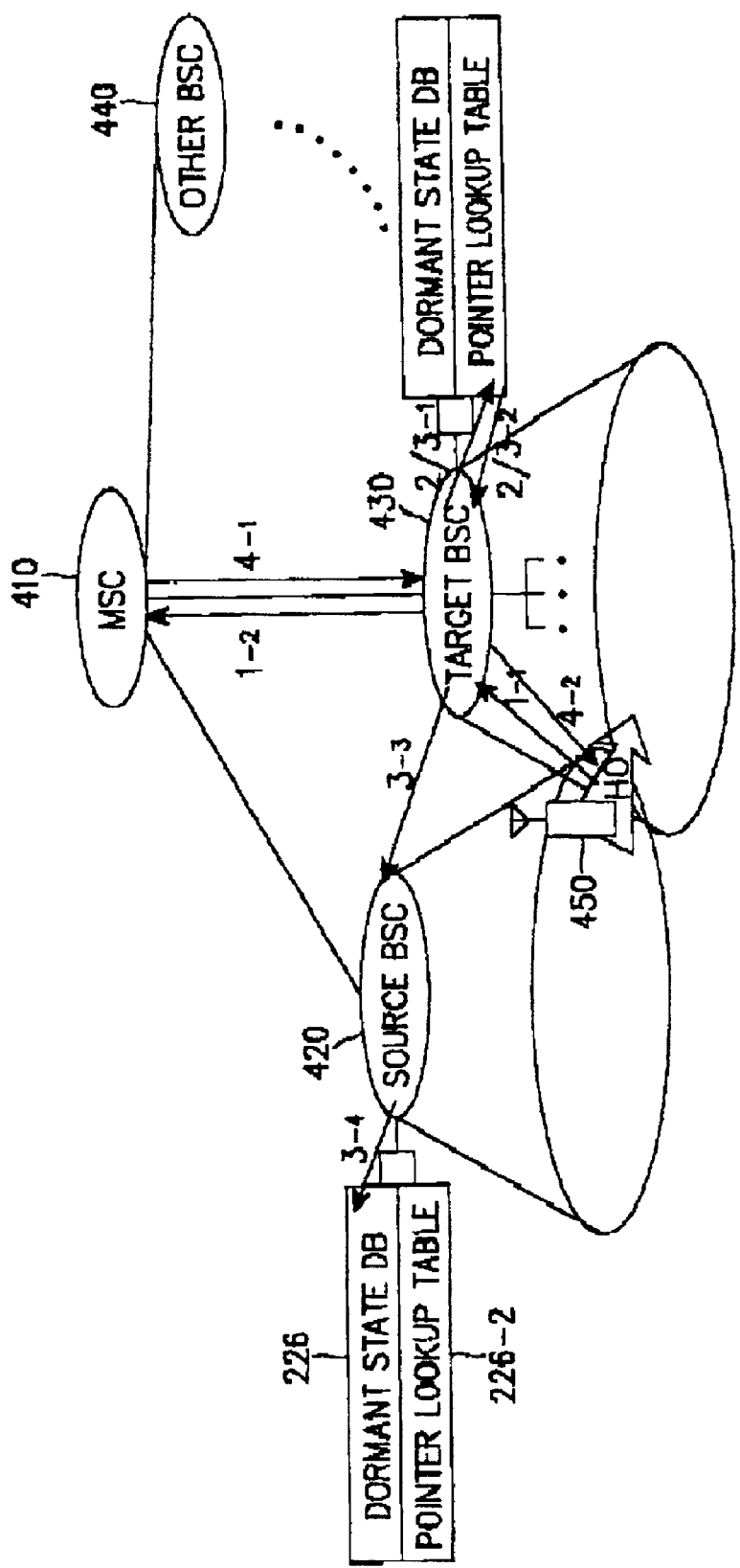
FIG. 7 is a view illustrating a process for terminal location registration in accordance with the preferred embodiment of the present invention.
Figure 15:
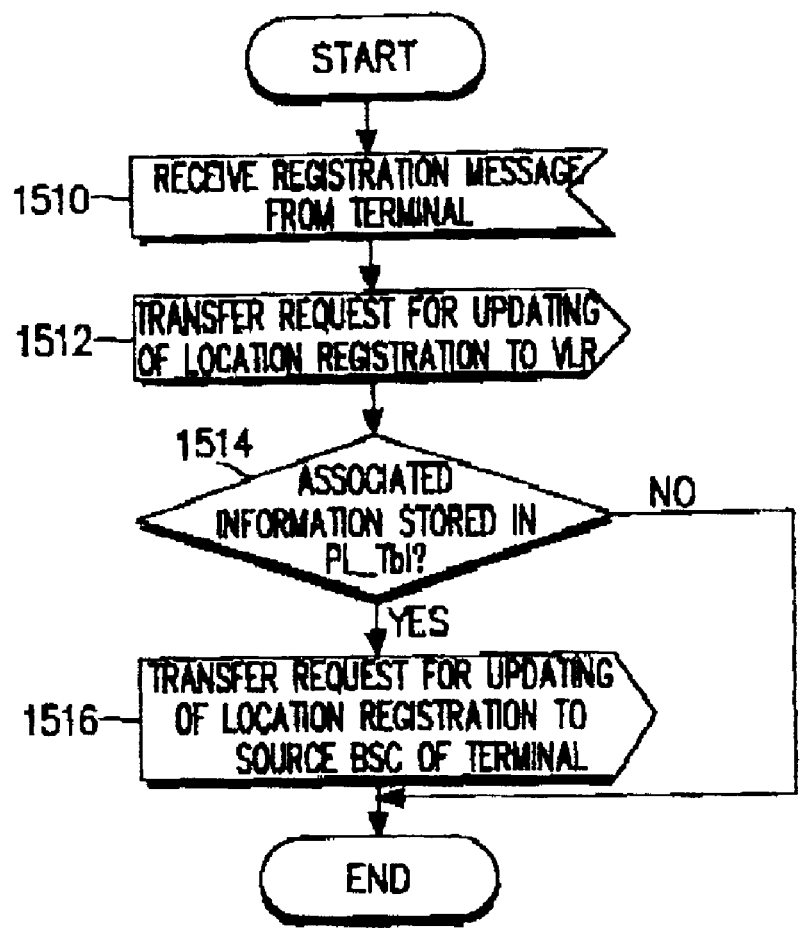
FIG. 15 is a flowchart illustrating a control operation of the target base station controller for the terminal location registration in accordance with the preferred embodiment of the present invention.

Upon receiving the registration message from the terminal 450, the target BSC 430 sends a location updating request message to the MSC 410 at step 1-2 of FIG. 7 so as to update location information stored in the VLR (steps 1510 and 1512 of FIG. 15).

After updating the location information in the VLR, the target BSC 430 determines at steps 2/3-1 and 2/3-2 of FIG. 7 whether the registration message sending terminal 450 has been activated with a packet service or requests an initial packet service (step 1514 of FIG. 15). In the present embodiment, this determination can be made by checking whether information of the terminal 450 has been registered in the PL-Tbl 226-2. That is, in case the information of the terminal 450 has previously been registered in the PL-Tbl 226-2 according to the procedures described above referring to FIGS. 4, 8 and 9, the terminal 450 can be considered to currently receive the activated packet service as the initialization operation is performed.

Upon determining that the terminal 450 has not been activated with the packet service, the target BSC 430 considers the terminal 450 to be in a null state, and then performs the above-stated operation based on the initial packet service activation. In this case, the BSC 430 acts as a source BSC, not a target BSC.

However, in the case where it is determined that the terminal 450 has been activated with the packet service, the target BSC 430 sends a location updating request message to the source BSC 420 on the basis of a source BSC ID at step 3-3 of FIG. 7 (step 1516 of FIG. 15).

Figure 14:
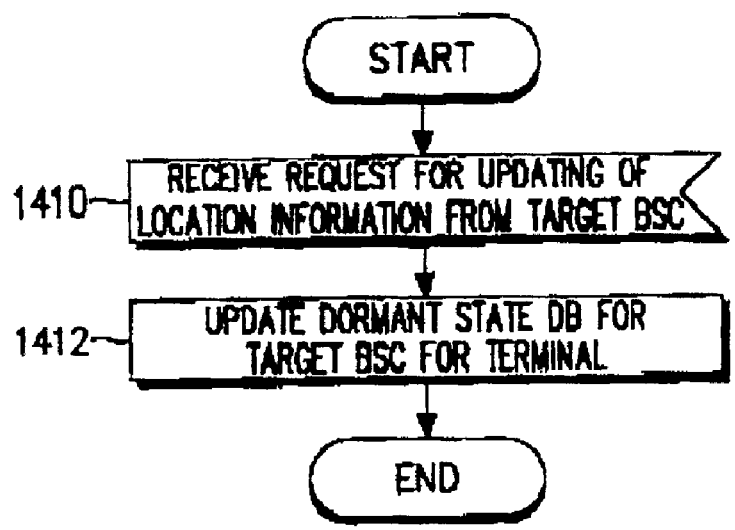
FIG. 14 is a flowchart illustrating a control operation of the source base station controller for the terminal location registration in accordance with the preferred embodiment of the present invention.

If the source BSC 420 receives the location updating request message sent at the above step 3-3, then it accesses the DS-DB 216 at step 3-4 of FIG. 7 to update location information of the terminal on the basis of the received message (steps 1410 and 1412 of FIG. 14).

Upon receiving a location updating Ack message from the MSC at step 4-1 of FIG. 7, the target BSC 430 sends a command message to the terminal 450 at step 4-2 of FIG. 7 to notify it of registration completion.

In accordance with the preferred embodiment of the present invention, as described above, a source BSC and target BSC are determined with regard to a specific terminal. The source BSC manages call information of the terminal through a DS-DB and the target BSC manages dormant state information of the terminal in a dormant state through a PL-Tbl. Therefore, the management, termination and origination of a dormant-state packet call can rapidly be conducted.

Next, an alternative embodiment of the present invention will be described in detail with reference to the annexed drawings. Some parts in this embodiment are substantially the same as those in the first embodiment and thus denoted by the same reference numerals even though they are depicted in different drawings. Further, a part of the construction and operation of the second embodiment are substantially the same as those of the first embodiment and a detailed description thereof will thus be omitted because it is considered to be unnecessary.

Figure 16:
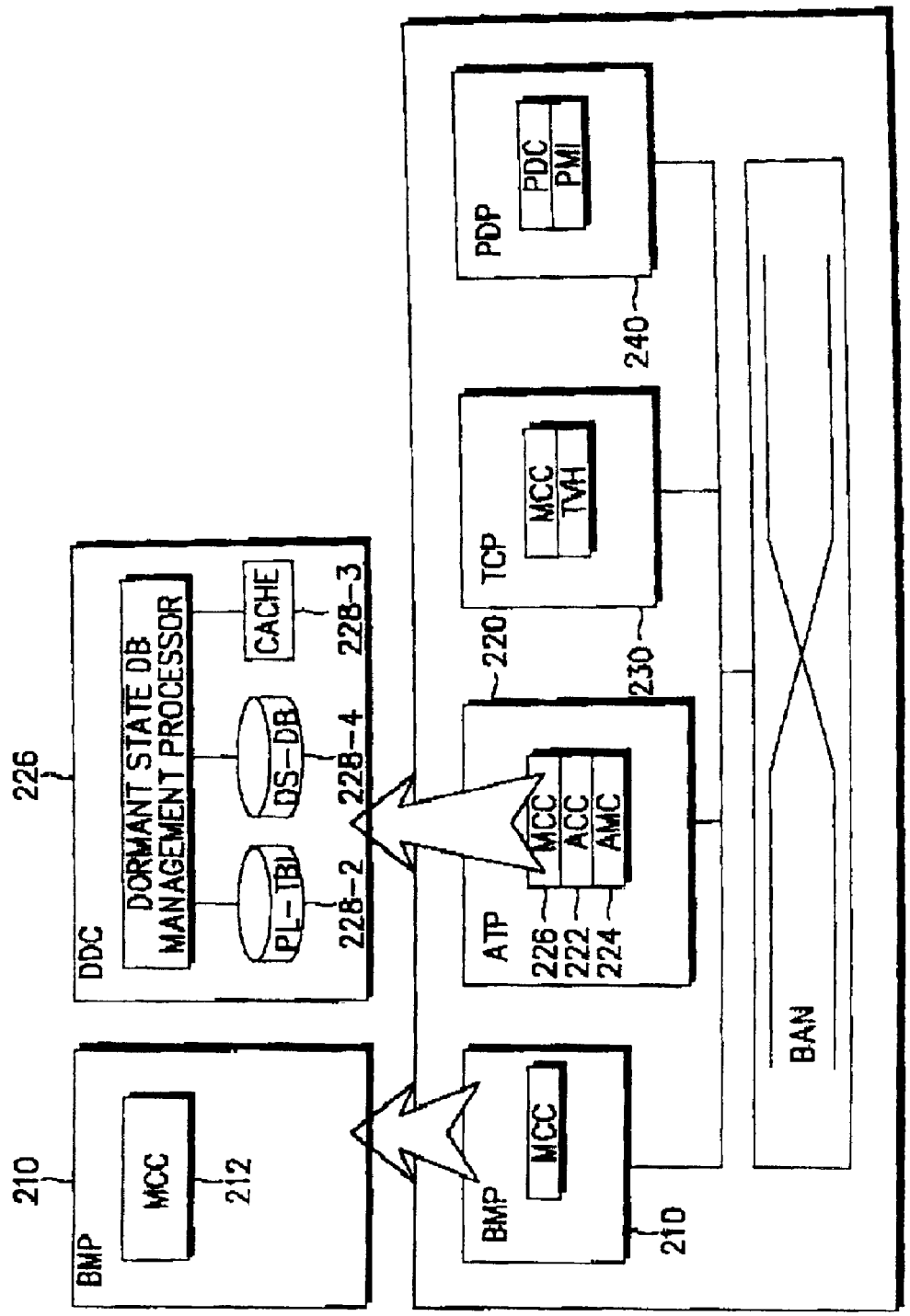
FIG. 16 is a block diagram showing the construction of a base station controller in accordance with the second embodiment of the present invention.

FIG. 16 is a block diagram showing the construction of a BSC in accordance with the second embodiment of the present invention. In the above-stated first embodiment, if a source BSC is determined, the other BSCs all are adapted to manage a dormant-state terminal. But, in the second embodiment to be described hereinbelow, if a source BSC is determined, a dormant-state terminal is managed by only a pointer lookup BSC (PL-BSC) that the source BSC determines on the basis of a hash function.

Additional modules of the BSC system according to the second embodiment of the present invention will hereinafter be described in more detail with reference to FIG. 16.

A DDC unit 226 is a module for performing a location management function proposed according to the second embodiment of the present invention. For management of a call entering the dormant state, the DDC unit 226 includes two databases 228-2 and 228-4 and one cache 228-3. The two databases 228-2 and 228-4 are substantially the same as the DS-DB and PL-Tbl in the first embodiment, respectively.

Of course, similarly to the first embodiment, in the second embodiment, a BSC in an MSC providing an initial packet service to a specific terminal is designated as a source BSC, the ATP board 220 of which includes a DS-DB 228-4 for storing terminal and dormant state information (call information). In the second embodiment, similarly to the first embodiment, the call information contains a terminal identifier (mobile ID), an ATP ID, location information, a PPP address, a PPP ID and a service option.

The PL-Tbl 228-2 is adapted to store source BSC identification information of a corresponding terminal. The PL-Tbl 228-2 is located in all 12 BSCs affiliated with one MSC, but source BSC identification information of a specific terminal is managed by only one BSC (i.e., a PL-BSC). The PL-BSC managing the source BSC identification information can be determined by a source BSC executing a hash function on the basis of a mobile ID (ESN/MIN) as a parameter.

The cache functions to, when a target BSC receives an initial registration message or origination message from a terminal, temporarily store source BSC identification information of the terminal such that the target BSC rapidly processes a message received from the same terminal afterwards. Namely, if a target BSC receives a registration message or origination message from a terminal at least one time, then it manages source BSC identification information of the terminal separately in the cache.

On the other hand, in the second embodiment of the present invention, as described above, dormant state information of a terminal in the dormant state is managed on the basis of a hash function: A description will first be given of an example of selection of a PL-BSC based on a hash function before describing the operation of the second embodiment in detail.

A source BSC or target BSC receiving a terminal's mobile ID (ESN/MIN) from the terminal executes a hash function on the basis of the received mobile ID and then determines a PL-BSC from a value obtained as a result of the hash function execution. For reference, the PL-BSC determined according to the hash function has a highest probability for the terminal to move from a current BSC.

For implementation of the second embodiment of the present invention, BSCs are classified according to given functions, more particularly into a source BSC, PL-BSC and target BSC. The respective operations of the classified BSCs will be briefly described hereinbelow. The source BSC is allocated by an initial call establishment request from a terminal in an MSC to register the terminal in a DS-DB, determine a PL-BSC by a hash function and manage dormant state information of the terminal in the determined PL-BSC. The PL-BSC is adapted to receive the dormant state information of the terminal from the source BSC and manage it through a PL-Tbl. The target BSC is adapted to receive a message from a terminal entering the dormant state, find a source BSC corresponding to the terminal, update location information, receive call information and provide a packet service.

The operations of the above-stated source BSC, target BSC and PL-BSC according to the second embodiment of the present invention will be described later in detail with reference to FIGS. 21 to 23.

Now, a detailed description will be given of the operation of the base station controller with the above-stated construction in accordance with the second embodiment of the present invention under the condition that it is classified into processes for initial packet service activation, packet service handover, cache-based packet service handover and database loss. It should be noted herein that, for implementation of the second embodiment, similarly to the implementation of the first embodiment, BSCs affiliated with one MSC exchange information with one another via a certain interface, which complies with "A7-interface" prescribed in "IS-634".

The initial packet service activation process is performed by an initial call establishment request from a terminal, and the other processes are performed when a handover occurs after the initial packet service activation process is performed. The processes performed when a handover occurs after the initial packet service activation process is performed are basically classified into the packet service handover process and the cache-based packet service handover process according to whether cache registration is made. On the other hand, the packet service handover process includes a process based on a loss of a database provided in a PL-BSC.

Firstly, for the initial packet service activation process, a source BSC receiving an initial packet service request from a terminal performs a call establishment operation, constructs a DS-DB corresponding to the terminal and then provides a packet service. The source BSC thereafter executes a hash function on the basis of a mobile ID of the terminal, determines a PL-BSC as a result of the hash function execution and provides dormant state information (containing a source BSC ID and mobile ID) to the determined PL-BSC such that the PL-BSC constructs a PL-Tbl with the dormant state information.

Figure 17:
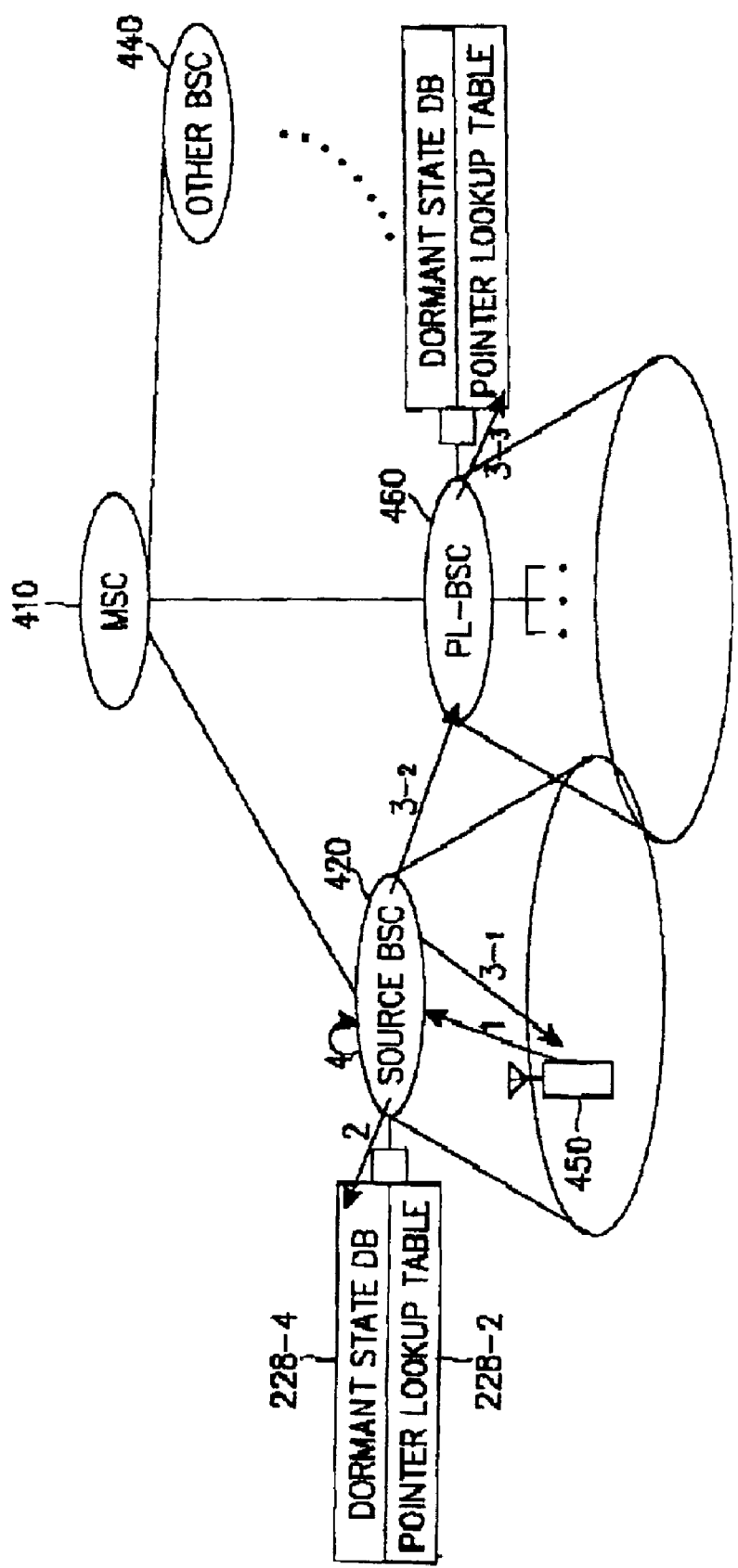
FIG. 17 is a view illustrating a process for initial packet service activation in accordance with the second embodiment of the present invention.

FIG. 17 is a view illustrating the initial packet service activation process in accordance with the second embodiment of the present invention.

If a terminal 450 sends an origination message to attempt an initial PPP connection for a packet service at step 1 of FIG. 17, then a BSC receiving the origination message is designated as a source BSC 420.

The source BSC 420 selects a specific ATP 220 for provision of the packet service to the terminal 450 from among a plurality of ATPs therein according to a load balancing rule and allocates the selected ATP 220 to the terminal 450. After being allocated to the terminal 450, the ATP 220 of the source BSC 420 receiving the origination message constructs a DS-DB 228-4 with call information corresponding to the terminal 450 at step 2. For the construction of the DS-DB 228-4, determinations must be made as to a mobile ID of the terminal, an ID of the ATP, information regarding the current location of the terminal, and a PPP address and PPP ID of an IWF (not shown). Further, although not shown, the source BSC 420 has to provide the call information of the DS-DB 228-4 to an MSC 410 to separately manage it in an HLR/VLR.

If the construction of the DS-DB 228-4 is completed at the above step 2, then the source BSC 420 provides the packet service to the terminal 450 according to a typical standard at step 3-1.

On the other hand, the source BSC 420 determines a PL-BSC on the basis of a hash function using the mobile ID of the terminal 450. Upon determining the PL-BSC, the source BSC 420 transfers dormant state information composed of its own ID (source BSC ID) and the mobile ID to the determined PL-BSC 460 at step 3-2.

If the PL-BSC 460 receives the dormant state information from the source BSC, then it constructs a PL-Tbl 228-2 with the received dormant state information by a DDC 226 in its ATP 220 at step 3-3. The constructed PL-Tbl 228-2 includes a mobile ID and a source B SC ID corresponding thereto.

In other words, the source BSC designates a BSC having a highest probability for the terminal provided with the packet service to move from the current location, as a PL-BSC for managing the dormant state information of the terminal.

Figure 18:
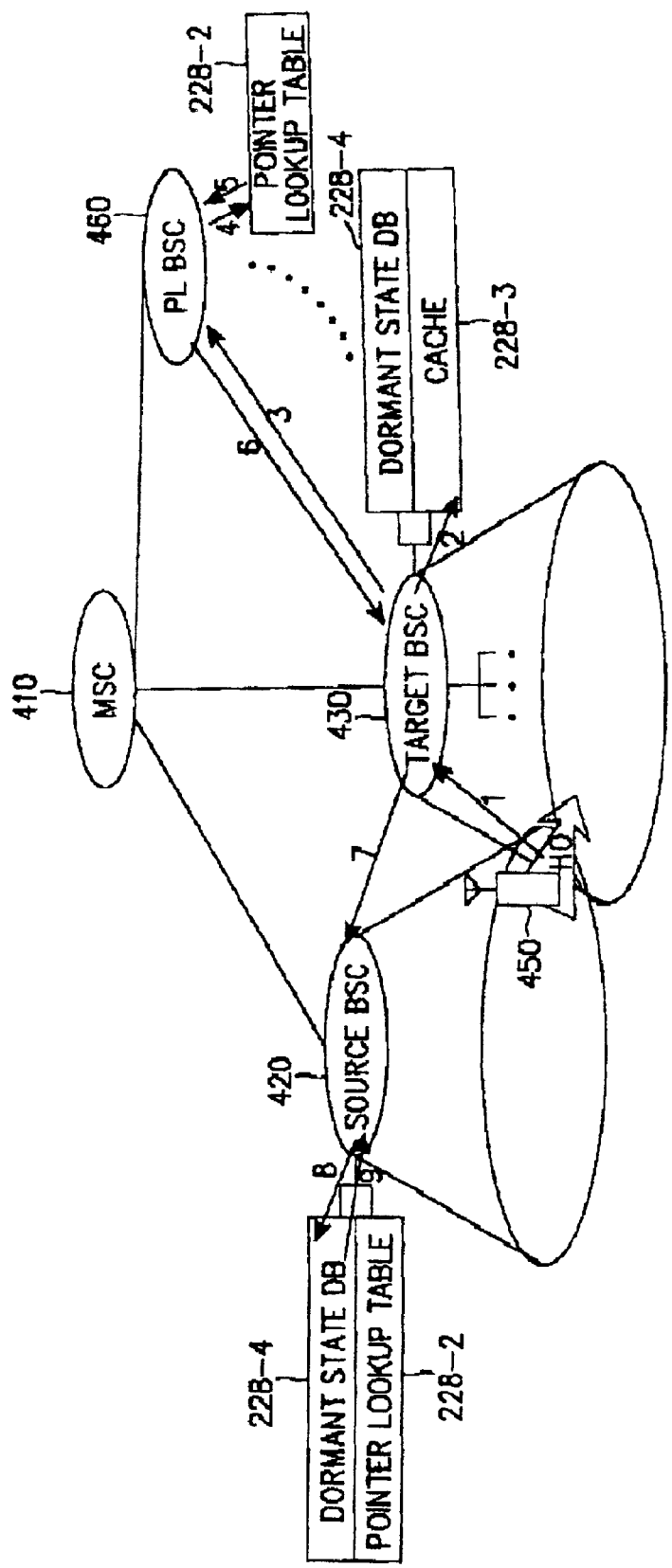
FIG. 18 is a view illustrating a process for a packet service handover in accordance with the second embodiment of the present invention.

Secondly, FIG. 18 is a view illustrating a process when a terminal conducts a handover from an initial call originating source BSC to a target BSC under the condition that cache registration is not made and no database loss occurs. For this process, information of the terminal 450 cannot be found in the cache 228-3 because the terminal 450 enters from the source BSC 420 to the target BSC 430 for the first time.

Referring to FIG. 18, the dormant-state terminal 450 sends a registration message or origination message owing to an idle handover at step 1. Here, the registration message is a registration request message and the origination message is a packet service resumption request message based on a transition from the dormant state to the active state.

Upon receiving the registration message or origination message from the terminal, the target BSC 430 searches its internal cache 228-3 for a mobile ID of the terminal 450 at step 2. If the mobile ID of the terminal 450 is not present in the cache 228-3, the target BSC 430 determines from a hash function which one of the BSCs in the MSC 410 includes a PL-Tbl having dormant state information of the terminal 450 registered therein. A BSC to be determined on the basis of the hash function is the PL-BSC 460 as stated previously.

Where the PL-BSC 460 is determined at the above step 2, the target BSC 430 inquires of the determined PL-BSC 460 about a source BSC for the terminal 450 at step 3. In response to the inquiry, the PL-BSC 460 searches the PL-Tbl 228-2 for an ID of the source BSC 420 corresponding to the mobile ID of the terminal 450 at steps 4 and 5.

If the PL-BSC 460 has found the ID of the source BSC 420, then it provides the found source BSC ID to the target BSC 430 at step 6. Upon receiving the source BSC ID from the PL-BSC 460, the target BSC 430 notifies the source BSC of terminal entry at step 7.

Upon being notified of terminal entry, the source BSC 420 updates location information in its internal DS-DB 228-4 at steps 8 and 9. Of course, the location information updated at these steps 8 and 9 is location information corresponding to the mobile ID of the terminal 450.

Accordingly, the source BSC 420 can continuously manage the location information of the dormant-state terminal 450 in the above manner.

Although the above-stated second process has been disclosed to provide the source BSC with the location information of the dormant-state terminal varying with a handover, it is also applicable to an operation of resuming a packet service in response to a packet service origination request from the dormant-state terminal.

Figure 19:
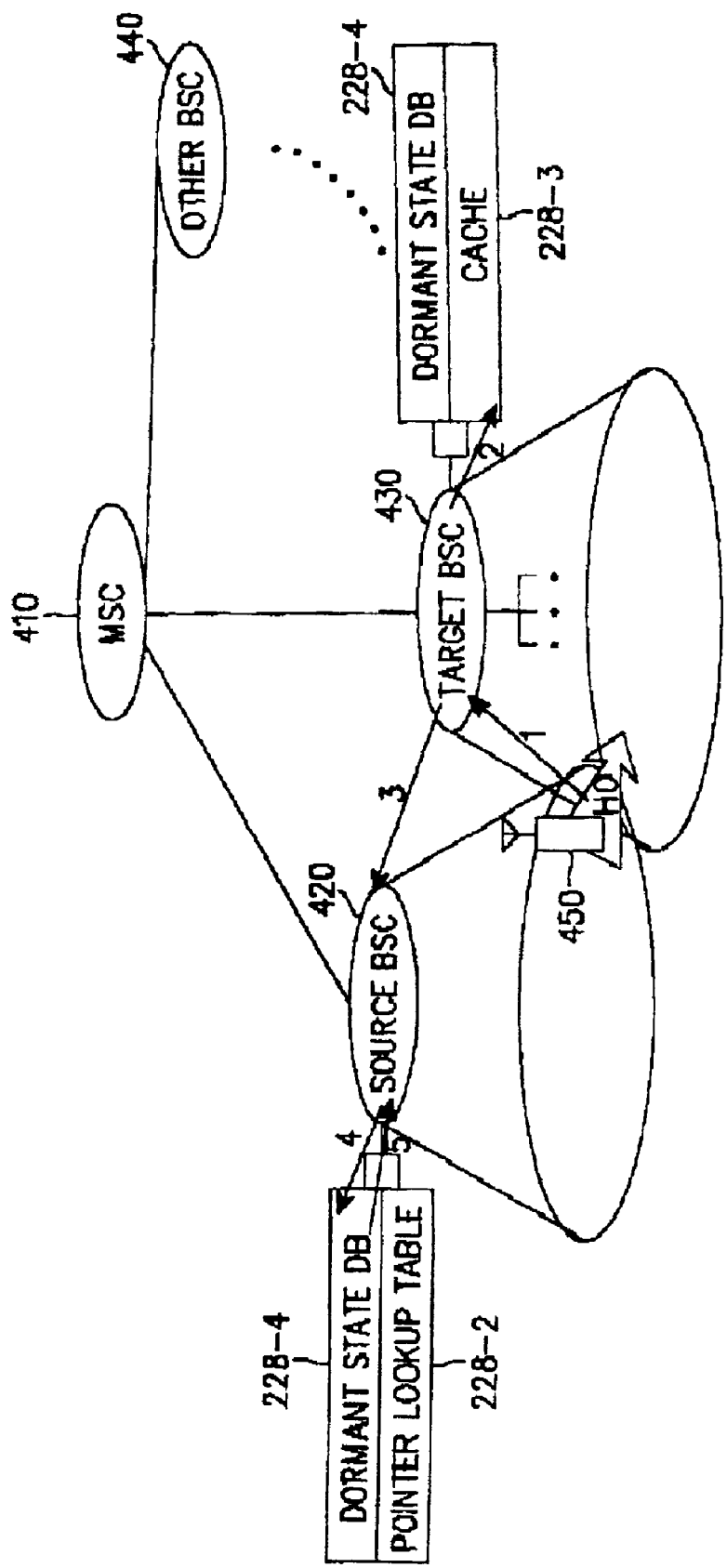
FIG. 19 is a view illustrating a process for a cache-based packet service handover in accordance with the second embodiment of the present invention.

Thirdly, FIG. 19 is a view illustrating a process when a terminal conducts a handover from an initial call originating source BSC to a target BSC under the conditions that cache registration is made and no database loss occurs. For this process, information of the terminal 450 can be found in the cache 228-3 because the terminal 450 has previously entered the target BSC 430.

Referring to FIG. 19, the dormant-state terminal 450 sends a registration message or origination message owing to an idle handover at step 1. Here, the registration message is a registration request message and the origination message is a packet service resumption request message based on a transition from the dormant state to the active state.

Upon receiving the registration message or origination message from the terminal, the target BSC 430 searches its internal cache 228-3 for a mobile ID of the terminal 450 at step 2. Where the mobile ID of the terminal 450 is present in the cache 228-3, the target BSC 430 finds an ID of the source BSC 420. If the target BSC 430 has found the ID of the source BSC 420, then it notifies the source BSC of terminal entry at step 3.

In the case where the source BSC 420 is notified of terminal entry, it updates location information in its internal DS-DB 228_4 at steps 4 and 5. Of course, the location information updated at these steps 4 and 5 is location information corresponding to the mobile ID of the terminal 450.

Accordingly, the source BSC 420 can continuously manage the location information of the dormant-state terminal 450 in the above manner.

Figure 20:
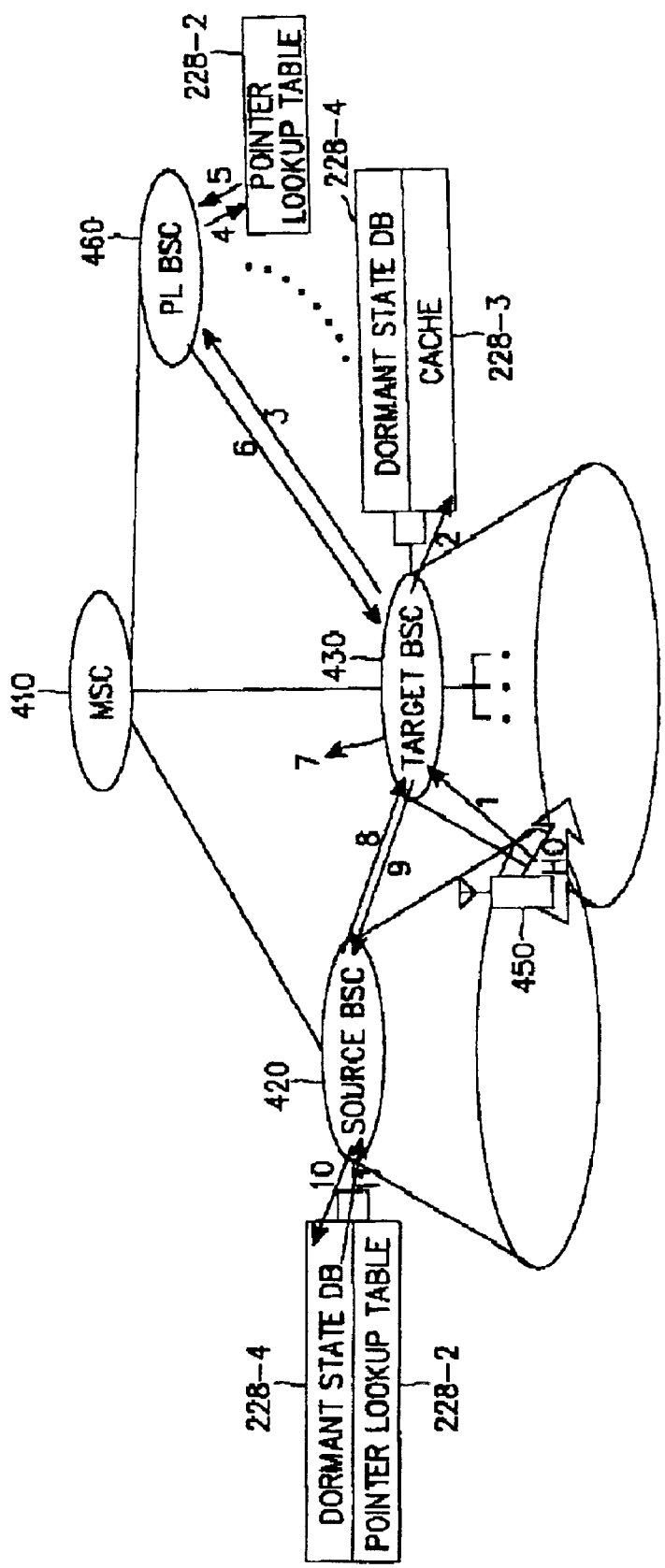
FIG. 20 is a view illustrating a process for a database loss in accordance with the second embodiment of the present invention.

Fourthly, FIG. 20 is a view illustrating a process when a terminal conducts a handover from an initial call originating source BSC to a target BSC under the condition that cache registration is not made and a database loss occurs. For this process, in that the terminal 450 enters from the source BSC 420 to the target BSC 430 for the first time, information thereof cannot be found in the cache 228-3 and is also not registered in the PL-Tbl 228-2 of the PL-BSC 460.

Referring to FIG. 20, the dormant-state terminal 450 sends a registration message or origination message owing to an idle handover at step 1, wherein the registration message is a registration request message and the origination message is a packet service resumption request message based on a transition from the dormant state to the active state.

Upon receiving the registration message or origination message from the terminal, the target BSC 430 searches its internal cache 228-3 for a mobile ID of the terminal 450 at step 2. If the mobile ID of the terminal 450 is not present in the cache 228-3, the target BSC 430 determines from a hash function which one of the BSCs in the MSC 410 includes a PL-Tbl having dormant state information of the terminal 450 registered therein. A BSC to be determined on the basis of the hash function is the PL-BSC 460 as stated previously.

Where the PL-BSC 460 is determined at the above step 2, the target BSC 430 inquires of the determined PL-BSC 460 about a source BSC for the terminal 450 at step 3. In response to the inquiry, the PL-BSC 460 searches the PL-Tbl 228-2 for an ID of the source BSC 420 corresponding to the mobile ID of the terminal 450 at steps 4 and 5.

In case the PL-BSC 460 fails to find the ID of the source BSC 420 corresponding to the mobile ID, namely, the mobile ID is not registered in the PL-Tbl 228-2, the PL-BSC 460 notifies the target BSC 430 of occurrence of an error in the search for the source BSC ID at step 6.

Upon being notified of the error occurrence in the search for the source BSC ID, the target BSC 430 broadcasts an inquiry message to all BSCs in the same MSC 410 at step 7 to inquire about which one of them manages call information of the terminal 450. At this time, the inquiry message contains an ID of the target BSC 430.

The source BSC 420 receiving the broadcast inquiry message sends an Ack message to the target BSC 430 at step 8, and the target BSC 430 then notifies the source BSC 420 of terminal entry at step 9.

If the source BSC 420 is notified of terminal entry, then it updates location information in its internal DS-DB 228-4 at steps 10 and 11. Of course, the location information updated at these steps 10 and 11 is location information corresponding to the mobile ID of the terminal 450.

The operations of the source BSC, target BSC and PL-BSC according to the second embodiment of the present invention will hereinafter be described in more detail.

Figure 21:
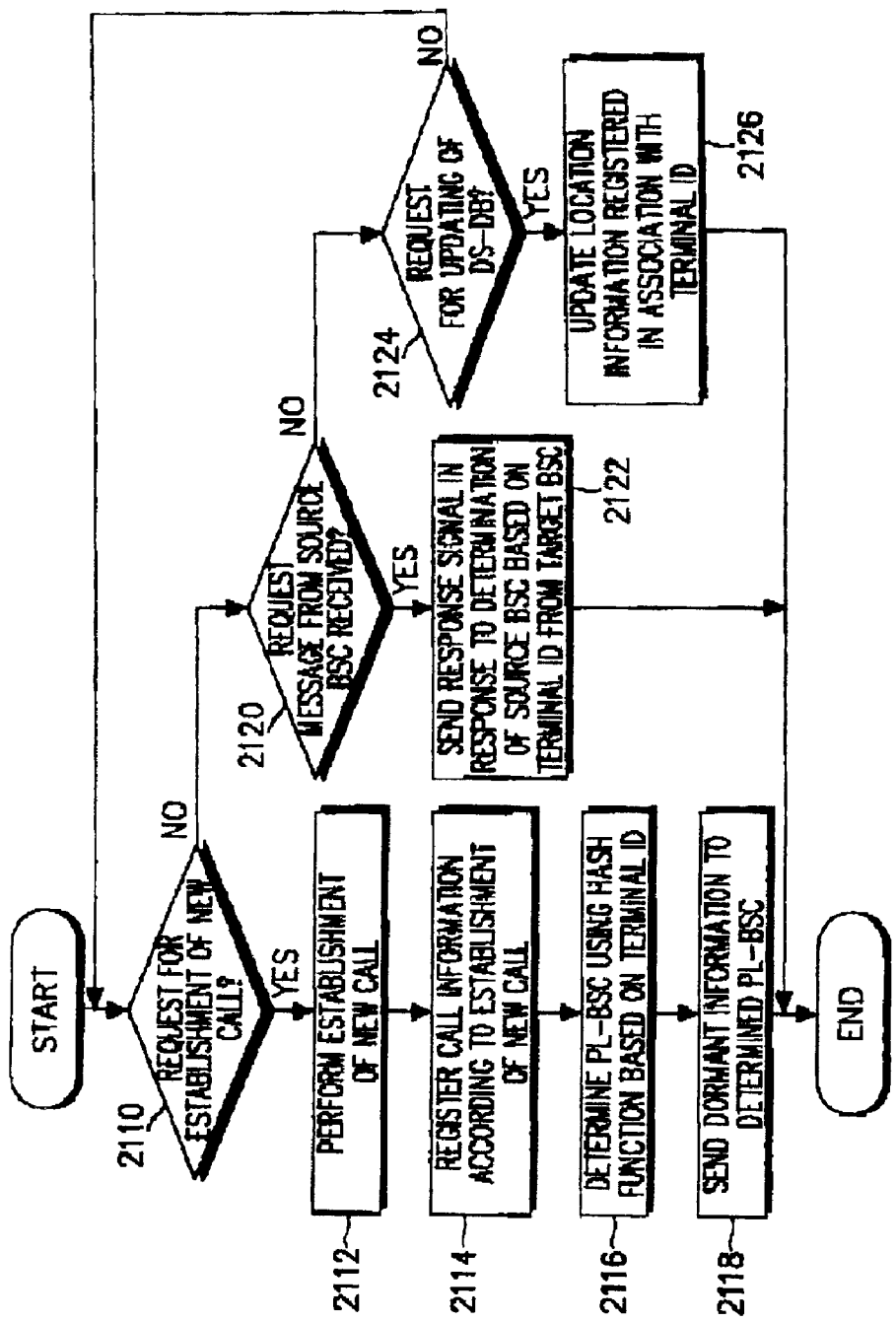
FIG. 21 is a flowchart illustrating a control operation of a source base station controller in accordance with the second embodiment of the present invention.

The BSC 420 determines at step 2110 of FIG. 21 whether a new call establishment request message for packet service origination is received from the terminal 450, and in turn at step 2120 whether a source BSC inquiry message is broadcasted from the target BSC 430. Also, the BSC 420 determines at step 2124 whether a message to request the updating of the DS-DB 228-4 therein is received from the target BSC 430.

In the case where it is determined at the above step 2110 that the new call establishment request message is received, the BSC 420 is designated as a source BSC for the message sending terminal 450 to perform procedures for a packet data service through steps 2112 to 2118.

At step 2112, the source BSC 420 performs a typical new call establishment operation to provide the packet data service to the terminal 450. If the new call establishment operation is completed at this step 2112, then the source BSC proceeds to step 2114 to register call information based on the new call establishment in its internal DS-DB 228-4. If the call information registration is completed, then the source BSC 420 proceeds to step 2116 to determine a PL-BSC 460 corresponding to a mobile ID of the terminal 450 by executing a hash function on the basis of the mobile ID. Upon determining the PL-BSC 460, the source BSC 420 proceeds to step 2118 to transfer dormant state information composed of the mobile ID and an ID of the source BSC to the determined PL-BSC 460.

The PL-BSC 460 receives the dormant state information transferred from the source BSC 420 at step 2310 and then proceeds to step 2314. At step 2314, the PL-BSC 460 updates the PL-Tbl 228-2 in such a manner that it registers the source BSC ID corresponding to the mobile ID contained in the dormant state information.

However, in the case where no new call establishment request message is received at the above step 2110 and the source BSC inquiry message is received at the above step 2120, the source BSC 420 proceeds to step 2122. From the reception of the source BSC inquiry message, it can be inferred that the terminal 450 has found a handover-based registration message or a packet data service origination message in a specific BSC.

Therefore, it can be seen that the source BSC inquiry message is sent from the target BSC 430, as will hereinafter be described in more detail.

Figure 22:
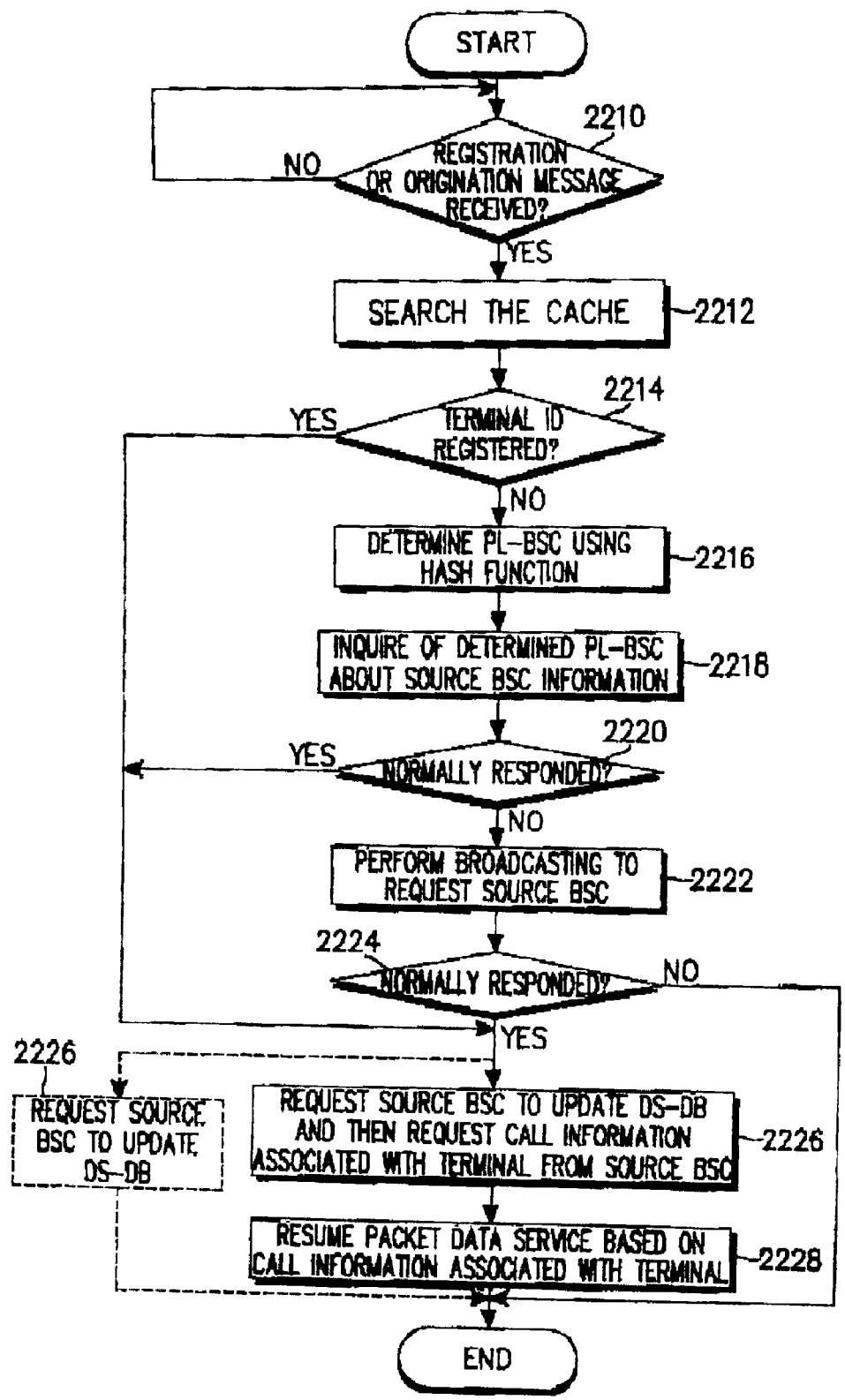
FIG. 22 is a flowchart illustrating a control operation of a target base station controller in accordance with the second embodiment of the present invention.

The target BSC 430 determines at step 2210 of FIG. 22 whether a registration message or origination message is received from the terminal 450 moving from the source BSC 420. If the registration message or origination message is determined to be received from the terminal 450 at step 2210, then the target BSC 430 proceeds to step 2212. At step 2212, the target BSC 430 searches the cache 228-3 to determine at step 2214 whether the mobile ID of the terminal 450 has been registered in the cache. The fact that the mobile ID has been registered in the cache 228-3 signifies that the access by the terminal 450 is not the first.

Upon determining at the above step 2214 that the mobile ID has not been registered, the target BSC 430 proceeds to step 2216 to determine a PL-BSC 460 corresponding to the mobile ID of the terminal 450 by executing a hash function on the basis of the mobile ID. After determining the PL-BSC 460 at this step 2216, the target BSC 430 proceeds to step 2118 to inquire of the determined PL-BSC 460 about a source BSC.

Figure 23:
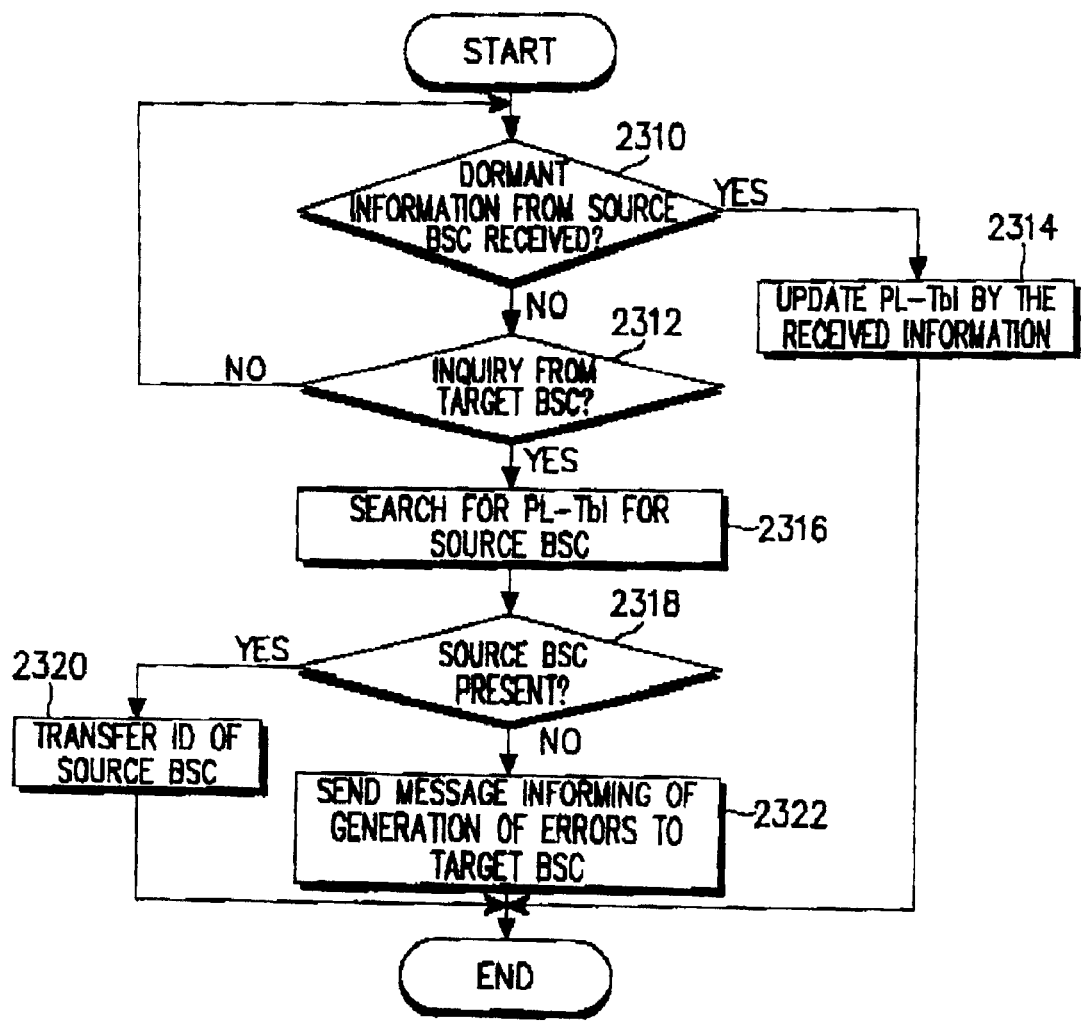
FIG. 23 is a flowchart illustrating a control operation of a pointer lookup base station controller in accordance with the second embodiment of the present invention.

On the other hand, if the PL-BSC 460 receives the inquiry message from the target BSC 430 at step 2312 of FIG. 23, then it proceeds to step 2316 to search the PL-Tbl 228-2 for a source BSC corresponding to the mobile ID and in turn to step 2318 to determine whether the corresponding source BSC is present. Where the source BSC corresponding to the mobile ID is determined to be present at step 2318, the PL-BSC 460 proceeds to step 2320 to transfer the searched source BSC ID to the target BSC 430.

After inquiring about a source BSC at the above step 2218, the target BSC 430 determines at step 2220 whether there is a normal response from the PL-BSC 460. The normal response is generated when the PL-BSC 460 searches for the source BSC and provides the source BSC ID as a result of the searching.

However, where the source BSC is determined not to be present in the PL-Tbl 228-2 at the above step 2318, the PL-BSC 460 proceeds to step 2322 to transfer an error message to the target BSC 430.

In this case, the target BSC 430 determines at the above step 2220 that there is no normal response from the PL-BSC 460, and then proceeds to step 2222 to broadcast an inquiry message about the source BSC corresponding to the terminal 450. Thereafter, the target BSC 430 determines at step 2224 whether there is a normal response to the inquiry message. The broadcasting is an operation of sending the same inquiry message to all BSCs affiliated with the same MSC 410. Thus, the broadcast inquiry message will be received by all the BSCs, which then search their respective DS-DBs 228-4 to check whether they are source BSCs for the terminal 450.

The source BSC 420 receiving the source BSC inquiry message at the above step 2120 also searches its DS-DB 228-4 using the mobile ID provided from the target BSC 430, as stated above. Upon determining from the search result that the BSC 420 is the source BSC for the terminal 450, it proceeds to step 2122 to send an Ack message to the target BSC 430.

On the other hand, where there is a normal response from the source BSC 420 at the above step 2224 or the mobile ID is present in the cache 228-3 at the above step 2214, the target BSC 430 proceeds to step 2226. The target BSC 430 also proceeds to step 2226 when the source BSC ID is provided from the PL-BSC 460 at the above step 2220. At step 2226, the target BSC 430 requests the source BSC 420 to update its DS-DB so as to notify it of terminal entry.

The source BSC 420 receives the DS-DB updating request from the target BSC 430 at step 2124 and then proceeds to step 2126. At step 2126, the source BSC 420 updates location information corresponding to the mobile ID, registered in the DS-DB 228-4, on the basis of information of the target BSC 430, resulting in the operation based on the registration message from the terminal 450 being ended.

Alternatively, in the case where the origination message is received from the terminal 450, the target BSC 430 requests the source BSC 420 to update the DS-DB 228-4 and in turn to send call information of the terminal 450. In response to these requests, the source BSC 420 reads call information corresponding to the mobile ID, registered in the DS-DB 228_4, and then provides the read call information to the target BSC 430. On the basis of the call information provided from the source BSC 420, the target BSC 430 resumes the packet data service to the terminal 450 at step 2228.

As apparent from the above description, the present invention can obtain diverse effects as it manages information about PPPs of packet service calls entering a dormant state and IWF under the condition in which the information is stored in the source BSC. That is, the following effects are obtained.

Firstly, when a terminal is activated for traffic sending, a rapid re-connection function is achieved because call establishment procedures such as registration and authentication may be dispensed with upon re-connection of a packet call maintained in a dormant state, based on an origination message.

Secondly, it is possible to minimize the signal message transmission/reception load generated between wireless and wired stages due to a call establishment.

Thirdly, when termination of a call from the network to a terminal is requested, the paging area can be approximated to the area where the terminal is located because the location of the terminal can be estimated even in a dormant state of the terminal, thereby achieving a reduction in paging load.

Fourthly, even when a packet service to be terminated to a terminal is provided from the network, the terminal can be traced. Accordingly, it is possible to support next-generation Internet protocols.

Fifthly, it is possible to support a distributed database structure using a simple modification of BSC in the form of an addition of additional modules to BSC. Accordingly, an easy extendibility is achieved. Also, the load to be processed by location management processors can be reduced by virtue of the distributed database structure. Accordingly, it is possible to efficiently manage a maximum number of subscribers in MSC.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method for managing call information associated with a plurality of mobile stations by a plurality of base station controllers in a wireless mobile telecommunications system including the base station controllers each adapted to provide packet data services to the mobile stations and provided with a packet data processor, each of the packet data services being performed between the base station controllers and the mobile stations via the packet data processor of an associated one of the base station controllers and a packet network connected to the packet data processor, comprising the steps of:

storing, in a source base station controller, call information created for the packet data service in a dormant state database, upon receipt of a call request message from a given one of the mobile stations;

transmitting an identifier of the given mobile station and an identifier of the source base station controller from the source base station controller to other base station controllers, if the given mobile station makes a transition to a dormant state; and storing, in the other base station controllers, the identifier of the given mobile station and the identifier of the source base station controller from the source base station controller in a pointer lookup table.

2. The method according to claim 1, further comprising the steps of:

checking, in a target base station controller, the identifier of the source base station controller stored in association with the identifier of the given mobile station from the pointer lookup table upon receipt of the call request message from the given mobile station in the dormant state;

sending a call information request for the given mobile station from the target base station controller to the source base station controller based on the checked identifier of the source base station controller;

sending the call information stored in association with the given mobile station from the source base station controller to the target base station controller upon receipt of the call information request; and connecting the packet network to the packet data processor associated with the target base station controller using the call information, in the target base station, and thus reconnecting the packet data service to the given mobile station upon receipt of the call information from the source base station.

3. The method according to claim 1, further comprising the steps of:

identifying, in the source base station controller, one of the base station controllers where a specific mobile station is located, based on the call information stored in the dormant state database in association with the specific mobile station upon receipt of a request for termination of packet data to the specific one of the mobile stations from the packet network through the packet data processor associated with the source base station controller;

requesting the identified base station controller to page the specific mobile station;

paging the specific mobile station, in the identified base station controller upon receipt of the paging request, and sending a call information request associated with the specific mobile station to the source base station controller when the specific mobile station responds to the paging;

sending, in the source base station controller, the call information stored in the dormant state database in association with the given mobile station to the identified base station controller upon receipt of the call information request; and connecting the packet network to the packet data processor using the received call information by the identified base station controller and thus reconnecting the packet data service to the given mobile station upon receipt of the call information from the source base station.

4. The method according to claim 1, further comprising the steps of:

checking, in a target base station controller, the identifier of the source base station controller stored along with the identifier of the given mobile station upon receipts of a registration message from the given mobile station maintained in the dormant state requesting, in the target base station controller, the source base station controller to update location information of the given mobile station, based on the checked identifier of the source base station controller; and updating, in the source base station controller, location information of the call information stored in the dormant state database in association with the given mobile station, based on location information from the target base station controller.

5. The method according to claim 1, wherein the call information contains the identifier of the mobile station, an air termination processor identifier, location information of the mobile station, a point-to-point protocol address, a point-to-point identifier, and a service option.

6. The method according to claim 2, wherein the target base station controller provides the identifier of the given mobile station when requesting the call information associated with the given mobile station from the source base station controller.

7. The method according to claim 4, wherein the location information of the mobile station is an identifier of the target base station controller.

8. A method for managing call information associated with a plurality of mobile stations by a plurality of base station controllers in a wireless mobile telecommunications system including the base station controllers each adapted to provide packet data services for the mobile stations and provided with a packet data processor, each of the packet data services being performed between the base station controllers and the mobile stations via the packet data processor of an associated one of the base station controllers and a packet network connected to the packet data processor, comprising the steps of:

storing, in the source base station controller, call information created for the packet data service in a dormant state database upon receipt of a call request message from a given one of the mobile stations;

determining, in the source base station controller, a pointer lookup base station controller from among the base station controllers to execute a hash function based on an identifier of the given mobile station, if the given one of the mobile station makes a transition to a dormant state;

transmitting, in the source base station controller, the identifier of the given mobile station and an identifier of the source base station controller to the pointer lookup base station controller; and storing, in the pointer lookup base station controller, the identifier of the given mobile station and the identifier of the source base station controller, received from the source base station controller, in a pointer lookup table.

9. The method according to claim 8, further comprising the steps of:

determining, in the target base station, a pointer lookup base station controller from among the other base station controller to execute a hash function based on an identifier of the given mobile station;

inquiring, in the target base station controller, to the pointer lookup base station controller about the source base station controller associated with the given mobile station;

transmitting, in the pointer lookup base station controller, the identifier of the source base station controller stored in the pointer lookup table in association with the identifier of the given mobile station;

requesting, in the target base station controller, call information associated with the given mobile station, from the source base station controller, based on the identifier of the source base station controller;

transmitting, in the source base station controller, the call information stored in the dormant state database in association with the given mobile station upon receipts of the call information request; and connecting, in the target base station controller, the packet data processor thereof to the packet network, based on the call information from the source base station controller, thereby resuming the packet data service suspended in association with the given mobile station.

10. The method according to claim 8, further comprising the steps of:

determining, in the target base station, a pointer lookup base station controller from among the other base station controller to execute a hash function based on an identifier of the given mobile station in the dormant state;

inquiring, in the target base station, to the pointer lookup base station controller about the source base station controller associated with the given mobile station;

transmitting, in the pointer lookup base station controller, to the target base station controller the identifier of the source base station controller stored in the pointer lookup table in association with the identifier of the given mobile station upon receipts of the identification request;

requesting, in the target base station controller, to the source base station controller to update location information of the given mobile station, based on the source base station controller identifier from the pointer lookup base station controller; and updating, in the source base station controller, the location information of the call information stored in the dormant state database in association with the given mobile station, based on location information from the target base station controller.

11. The method according to claim 8, wherein the call information contains the identifier of the mobile station, an air termination processor identifier, location information of the mobile station, a point-to-point protocol address, a point-to-point identifier, and a service option.

12. The method according to claim 9, wherein the target base station controller provides the identifier of the given mobile station upon requesting the call information associated with the given mobile station from the source base station controller.

13. The method according to claim 10, wherein the location information of the mobile station is an identifier of the target base station controller.

14. The method according to claim 9, further comprising the step of:

storing, in the target base station controller, the identifier of the given mobile station and the source base station controller identifier from the pointer lookup base station controller in a cache internally provided in the target base station controller.

15. The method according to claim 14, wherein when the identifier of the given mobile station has been stored in the cache, the target base station controller then requests the call information, associated with the given mobile station, from the source base station controller, based on the identifier of the source base station controller stored in the cache, without inquiring of the pointer lookup base station controller about the source base station controller.

16. The method according to claim 11, further comprising the step of:

storing, in the target base station controller, the identifier of the given mobile station and the source base station controller identifier from the pointer lookup base station controller in a cache internally provided in the target base station controller.

17. The method according to claim 16, wherein when the identifier of the given mobile station has been stored in the cache, the target base station controller then requests the call information, associated with the given mobile station, from the source base station controller, based on the identifier of the source base station controller stored in the cache, without inquiring of the pointer lookup base station controller about the source base station controller.

18. The method according to claim 15, wherein:

when the identifier of the given mobile station has been stored in neither the pointer lookup table nor the cache, the target base station controller then inquires of the plurality of the base station controllers about the source base station controller associated with the identifier of the given mobile station; and in response to the identification request, the source base station controller informs the target base station controller of the identifier thereof.

19. The method according to claim 8, further comprising the steps of:

upon receipt of a request for termination of packet data to a specific one of the mobile stations from the packet network through the packet data processor associated with the source base station controller, identifying by the source base station controller one of the base station controllers where the specific mobile station is located, based on call information stored in the dormant state database in association with the specific mobile station;

requesting the identified base station controller to page the specific mobile station;

upon receipt of the paging request, paging the specific mobile station by the identified base station controller, and sending a call information request associated with the specific mobile station to the source base station controller when the specific mobile station responds to the paging;

upon receipt of the call information request, sending by the source base station controller the call information stored in the dormant state database in association with the given mobile station to the identified base station controller; and upon receipt of the call information from the source base station, connecting the packet network to the packet data processor using the received call information by the identified base station controller and thus reconnecting the packet data service to the given mobile station.

20. An apparatus for managing call information associated with a plurality of mobile stations by a plurality of base station controllers in a wireless mobile telecommunications system including the base station controllers each adapted to provide packet data services for the mobile stations and provided with a packet data processor, each of the packet data services being performed between the base station controllers and the mobile stations via the packet data processor of an associated one of the base station controllers and a packet network connected to the packet data processor, comprising:

a source base station controller corresponding to one of the base station controllers, the source base station controller serving to store, in a dormant state database, call information produced for the packet data service associated with the source base station controller in response to a call request message from a given one of the mobile stations, while sending an identifier of the given mobile station and an identifier of the source base station controller to the other base station controllers; and the other base station controllers each storing the identifier of the given mobile station and the identifier of the source base station controller in a pointer lookup table.

21. The apparatus according to claim 20, further comprising:

a target base station controller corresponding to one of the other base station controllers, the target base station controller receiving the call request message from the given mobile station maintained in the dormant state, searching, in response to the call request message, a pointer lookup table for the identifier of the source base station controller stored in association with the identifier of the given mobile station, receiving call information, associated with the given mobile station, from the source base station controller based on the identifier of the source base station controller, and connecting the packet data processor of the target base station controller to the packet network based on the call information, thereby resuming the packet data service suspended in association with the given mobile station.

22. The apparatus according to claim 20, further comprising:

a target base station controller corresponding to one of the other base station controllers, the target base station controller receiving a registration message from the given mobile station maintained in the dormant state, searching, in response to the registration message, a pointer lookup table for the identifier of the source base station controller stored in association with the identifier of the given mobile station, and requesting the source base station controller to update location information of the given mobile station, based on the identifier of the source base station controller.

23. The apparatus according to claim 20, wherein the call information contains the identifier of the given mobile station, an air termination processor identifier, location information of the given mobile station, a point-to-point protocol address, an identifier of the point-to-point protocol, and a service option.

24. The apparatus according to claim 21, wherein the call request message contains the identifier of the given mobile station.

25. The apparatus according to claim 22, wherein the location information of the given mobile station is an identifier of the target base station controller.

26. An apparatus for managing call information associated with a plurality of mobile stations by a plurality of base station controllers in a wireless mobile telecommunications system including the base station controllers each adapted to provide packet data services for the mobile stations and provided with a packet data processor, each of the packet data services being performed between the base station controllers and the mobile stations via the packet data processor of an associated one of the base station controllers and a packet network connected to the packet data processor, comprising:

a source base station controller for storing, in a dormant state database, call information produced for the packet data service associated with the source base station controller in response to a call request message from a given one of the mobile stations, executing a hash function based on an identifier of the given mobile station to determine a pointer lookup base station controller, receiving and sending, to the determined pointer lookup base station controller, an identifier thereof along with the identifier of the given mobile station, the pointer lookup base station controller for storing the identifier of the given mobile station and the identifier of the source base station controller, received from the source base station controller, in a pointer lookup table.

27. The apparatus according to claim 26, further comprising:

a target base station controller for receiving the call request message from the given mobile station maintained in the dormant state, executing, in response to the call request message, a hash function based on an identifier of the given mobile station to determine the pointer lookup base station controller, receiving from the determined pointer lookup base station controller the identifier of the source base station controller stored in association with the identifier of the given mobile station, receiving from the source base station controller the call information associated with the given mobile station, based on the identifier of the source base station controller, and connecting an internal packet data processor thereof to the packet network based on the call information, thereby resuming the packet data service suspended in association with the given mobile station.

28. The apparatus according to claim 26, further comprising:

a target base station controller for receiving a registration message from the given mobile station maintained in the dormant state, executing, in response to the registration message, a hash function based on an identifier of the given mobile station to determine the pointer lookup base station controller, receiving from the determined pointer lookup base station controller the identifier of the source base station controller stored in association with the identifier of the given mobile station, and requesting the source base station controller to update location information of the given mobile station, based on the identifier of the source base station controller.

29. The apparatus according to claim 26, wherein the call information contains the identifier of the given mobile station, an air termination processor identifier, location information of the given mobile station, a point-to-point protocol address, an identifier of the point-to-point protocol, and a service option.

30. The apparatus according to claim 27, wherein the call request message contains the identifier of the given mobile station.

31. The apparatus according to claim 28, wherein the location information of the mobile station is an identifier of the target base station controller.

32. The method according to claim 17, wherein:

when the identifier of the given mobile station has been stored in neither the pointer lookup table nor the cache, the target base station controller then inquires of the plurality of the base station controllers about the source base station controller associated with the identifier of the given mobile station; and in response to the identification request, the source base station controller informs the target base station controller of the identifier thereof.

* * * * *